US006636504B1

(12) United States Patent
Albers et al.

(10) Patent No.: US 6,636,504 B1
(45) Date of Patent: Oct. 21, 2003

(54) REVERSE BILLING OF INTERNET TELEPHONE CALLS

(75) Inventors: Raymond F. Albers, Vienna, VA (US); Edward F. Balkovich, Potomac, MD (US); David Young, Silver Spring, MD (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/271,450

(22) Filed: Mar. 18, 1999

(51) Int. Cl.[7] .............................................. H04J 15/00
(52) U.S. Cl. ...................................... 370/352; 370/401
(58) Field of Search ................................ 370/352, 401, 370/389; 379/114.14, 114.15, 114.17, 114.21, 114.24; 455/406

(56) References Cited

U.S. PATENT DOCUMENTS

| | | | | |
|---|---|---|---|---|
| 5,621,783 A | * | 4/1997 | Lantto et al. | 455/406 |
| 6,185,288 B1 | * | 2/2001 | Wong | 379/219 |
| 6,292,478 B1 | * | 9/2001 | Farris | 370/352 |

OTHER PUBLICATIONS

Internet Collect webpage (2 pages) http://www.internetcollect.com/english.htm.
Internet Collect webpage (2 pages) http://www.internetcollect.com/services.htm.
Internet Collect webpage (2 pages) http://www.internetcollect.com/faq1.htm.

* cited by examiner

Primary Examiner—Salvatore Cangialosi
(74) Attorney, Agent, or Firm—Leonard C. Suchyta; Loren Swingle; Rader, Fishman & Grauer PLLC

(57) ABSTRACT

In recent years, the world-wide packet data network, commonly known as the Internet, has grown exponentially. The data network now reaches virtually all businesses, most schools and an increasing number of homes. To provide an alternative to all or portions of the carrier-based telephone network, a number of companies have developed equipment and software that enable voice telephone-like communications via the Internet. Severs are now coming on line, which enable calls over the Internet to go off-net to end user stations still coupled to the local telephone network. A number of situations arise where a telephone service subscriber wants to allow callers to call the subscriber's equipment and have part or all of the communication charges billed to and paid by the subscriber. The invention enables such billing to the called party, for calls routed partially or entirely via the Internet. In one example, a caller with a multimedia PC and Internet access uses the subscriber's Internet address plus the subscriber's telephone number. The address identifies a gateway serving the subscriber, and the gateway places a telephone call to the subscriber's telephone. The network accumulates all billing information in records for application against the called subscriber's account.

37 Claims, 10 Drawing Sheets

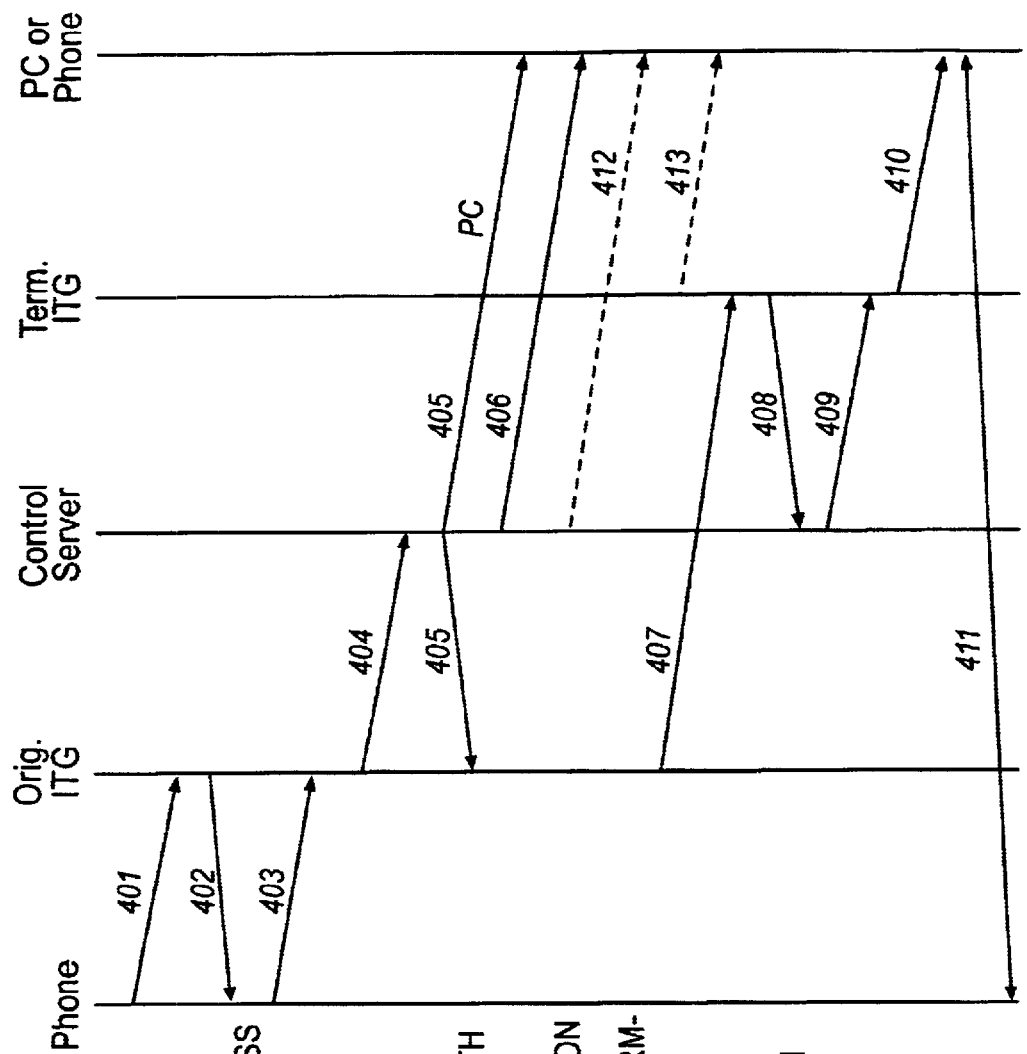

FIG. 4

PHONE TO PHONE OR PC CALL SETUP:

401. PHONE DIALS INTO AN ORIGINATING ITG
402. ORIG. ITG PROMPTS FOR SUBSCRIBER ID
403. PHONE SUPPLIES SUBSCRIBER ID
404. ORIG. ITG REQUEST AUTHORIZATION FROM CONTROL SERVER
405. CONTROL SERVER PROVIDES ADDRESS OF TERMINATING ITG; IF THE CALLED SUBSCRIBER IS A PC, THEN A CONNECTION CAN BE ESTABLISHED WITHOUT THE TERM. ITG
406. CONTROL SERVER INFORMS TERM. ITG OF AUTHORIZATION OF CALL
407. ORIG. ITG ESTABLISHES SESSION WITH TERM. ITG
408. TERM. ITG VERIFIES WITH CONTROL SERVER THAT PROPER AUTHORIZATION WAS ISSUED
409. CONTROL SERVER PROVIDES CONFIRMATION TO TERM. ITG
410. TERM. ITG SETUPS CALL WITH PHONE
411. PHONE COMPLETES CALL SETUP WITH CALLING PHONE
412. *OPTIONAL*: CONTROL SERVER USES AN SS7 LINK TO DETERMINE WHETHER CALLED PC OR PHONE IS BUSY
413. *OPTIONAL*: TERM. ITG DETERMINES WHETHER CALLED PHONE IS BUSY

Key- Optional Signaling: ------▶

REVERSE BILLING OF INTERNET TELEPHONE CALLS

FIELD OF INVENTION

This invention relates to Internet telephony, and more specifically relates to billing of Internet telephone calls to the called party (i.e., reverse billing).

ACRONYMS

The written description uses a large number of acronyms to refer to various services and system components. Although known, use of several of these acronyms is not strictly standardized in the art. For purposes of this discussion, acronyms therefore will be defined as follows:

Advanced-Intelligent Network (AIN)
Common Channel Signaling (CCS)
Domain Name Server (DNS)
Dual Tone Multifrequency (DTMF)
Integrated Service Control Point (ISCP)
Internet Protocol (IP)
Internet Service Provider (ISP)
Interactive Voice Response (IVR)
Local Access and Transport Area (LATA)
Local Area Network (LAN)
Local Exchange Carrier (LEC)
Memory Administration Recent Change System (MARCH)
Mobile Switching Center (MSC)
Multiline Hunt Group (MLHG)
Multi-Services Application Platform (MSAP)
Mobile Telephone Switching Office (MTSO)
Maximum Transmission Unit (MTU)
Operations Support System (OSS)
Plain Old Telephone Service (POTS)
Public Switched Telephone Network (PSTN)
Routing Control Record (RCR)
Routing Table Protocol (RTP)
Service Control Point (SCP)
Service Switching Point (SSP)
Signaling Transfer Point (STP)
Station Message Detail Recording (SMDR)
Telephone Company (TELCO)
Transaction Capabilities Applications Protocol (TCAP)
Transport Control Protocol (TCP)
Transport Control Protocol/Internet Protocol (TCP/IP)
Universal Call Distributor (UCD)
User Datagram Protocol (UDP)
Voice Over Internet Protocol (VoIP)

BACKGROUND OF THE INVENTION

Computer telephony has emerged from the realization that traditional telephone services can be enhanced with the assistance of computer processing. The requisite computing power can be found in today's personal computers, which are geometrically increasing in speed and capacity. This realization provides for a more cost effective and feature rich telephony scheme.

Attention recently has been directed to implementing a variety of computer telephony applications over the world-wide packet data network now commonly known as the Internet. The Internet had its genesis in U.S. Government programs funded by the Advanced Research Projects Agency (ARPA). ARPA's research spawned a national internetworked data communication system, stemming in part from its ARPA network (ARPANet). Further, this work resulted in the development of networking standards as well as a set of conventions, known as protocols, for interconnecting data networks and routing information across the networks. These protocols are commonly referred to as TCP/IP. The TCP/IP protocol suite was originally developed for use over ARPANET to facilitate communication primarily among academia and the various government research facilities, but have subsequently become widely accepted and deployed by the pub at large. The Internet provides two broad types of services: connectionless packet delivery service and reliable stream transport service.

The Internet basically comprises several large national computer networks joined together over high- speed data links ranging from ISDN Primary Rate Interface (PRI) to T3, OC-3 (optical carrier), OC-12, etc. The most prominent of these national nets are MILNET (Military Network), NSFNET (National Science Foundation NETwork), and CREN (Corporation for Research and Educational Networking). The growth of such networks continue to increase, along with the number of peripheral networks. In 1995, the Government Accounting Office (GAO) reported that the Internet linked 59,000 networks, 2.2 million computers and 15 million users in 92 countries. However, since then it is estimated that the number of Internet users continues to double approximately annually. In simplified fashion the Internet may be viewed as a series of packet data processors or "routers" connected together with computers linked to the routers.

The infrastructure of the Internet is sustained by Internet service providers (ISPs) and the information (or content) providers (IPs). These two types of providers coexist to support the vast knowledge base that makes the Internet an invaluable tool for information exchange. The information providers (e.g., America-Online, CompuServe, Prodigy, etc.) constitute the end systems that collect and market information through their own network of computers that is attached to a node on the Internet. ISPs are companies such as UUNET, PSI, MCI and SPRINT which market the usage of their networks to transport the information.

A simplified diagram of the Internet and various types of systems typically connected thereto, is shown in FIG. 9. Generally speaking the Internet consists of autonomous systems of packet data networks which may be owned and operated by the ISPs. An autonomous system is a grouping of networks and gateways that are controlled by a single administrative authority. Three such ISPs (or autonomous systems) appear in FIG. 9 at 1310, 1312 and 1314. These autonomous systems are linked by high-speed connections 1311, 1313 and 1315.

While the physical structure of the Internet plays an instrumental role in the vitality of the Internet, the information housed within the interconnected computing systems have an even more significant role. The responsibility for supplying and maintaining the information lies in part with the Information Providers. IPs 1316 and 1318 connect to the Internet via high speed lines 1320 and 1322, such as T1, T3, OC-3, and the like. Information Providers generally do not have their own Internet based autonomous systems but have or use Dial-Up Networks such as SprintNet (X.25), DATAPAC and TYMNET.

By way of current illustration, MCI is both an ISP and an information provider. SPRINT is an ISP; and the Microsoft Network (MSN) is an information provider using UUNET as an ISP. Other information providers, such as universities and governmental entities, are indicated in exemplary fashion at 1324 and are connected to the ISPs via the same type connections here illustrated as T1 lines 1326. Local Area Networks (LANs), such as those illustrated in 1328 and 1330, are connected through routers 1332 and 1334 and high speed data links such as T1 lines 1336 and 1338. Laptop computers 1340 and 1342 are representative of computers connected to the Internet via the public switched telephone network (PSTN) and are shown connected to the ISPs via dial-up links 1344 and 1346.

To manage the complex internetworked computing systems within the Internet, each device (whether internetworking equipment or computers) must be represented by a unique address. In the addressing scheme of the Internet, an address comprises four octets. This is called the Internet Protocol (IP) address. An example of an IP address would be 164.109.211.237. To make the IP addresses more manageable and understandable by humans, a network of domain name servers (not shown) exist to translate an IP address into a textual Domain Name (e.g., bellatlantic.com) to facilitate easy of use.

When a packet bearing a destination address leaves the source router, according to one routing protocol the router determines the minimum number of hops (i.e., links) to the destination. The database is populated by the router sending and receiving information from neighboring routers. The router then sends the packet to an adjacent router as determined from its routing table, and the procedure is repeated until the packet arrives at the destination computer. The separate packets that constitute a message may not travel the same path because of the datagram delivery mechanism of the IP protocol. However, they all reach the same destination and are assembled in their original order in a connectionless fashion (by the TCP protocol). This is in contrast to connection oriented routing modes, such as frame relay and ATM or voice. These connection oriented services can accommodate IP traffic. Given the ubiquity of the Internet, a number of communication services have emerged that traditionally have been provided over a circuit switched infrastructure. For example, voice communication can be realized over the Internet.

Experimentation with voice over the Internet began a few years ago. Because standard voice encoding over the traditional telephone network requires 64 kbps of bandwidth, straight-forward migration from the telephone network to the Internet user was not possible. These Internet users are equipped with modems that transmit at a lower rate than 64 kbps; e.g., 33 kpbs and 56 kbps. Furthermore, these lower rate modems cannot truly achieve their stated rates because of poor transmission lines (requiring retransmission) and use of overhead bits for signaling and control. Improvement in compression technology, however, has provided a viable method for carrying voice over the Internet. In the past, to establish and maintain a call session, the users were required to use compatible software on both ends. This requirement posed a problem in that such software were not readily available and possessed many software bugs. As a result, voice quality over the Internet was poor. Dropouts were frequent because of the "best effort" delivery system of the Internet. Further, long processing delays were encountered, which stemmed from compression/decompression and encoding/decoding. These problems were tolerable because the Internet users can make "free" long distance calls practically anywhere around the world. It is "free" in the sense that the users do not incur message unit charges (i.e., call duration based charges) for that portion of the call path that uses the Internet.

Recently, computer telephony vendors have developed software for use on personal computers to permit more reliable two-way transfer of real-time voice information via an Internet data link between two personal computers. In one of the directions, the sending computer converts voice signals from analog to digital format. The software facilitates data compression down to a rate compatible with modem communication via a POTS telephone line, in some cases as low as 2.4 kbps. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between registered Internet users.

Such programs have relied on servers attached to the Internet to establish voice communication links through the networks. Because the user bears minimal cost (e.g., access fees) to use the Internet, it is desirable to place voice calls over the Internet to avoid toll charges, which are substantially more expensive for calls over the traditional PSTN and interexchange carriers. With VoIP, each person active on the network, who is willing to accept a voice call, must register with a server (e.g., a voice communication server). Thus, a calling party can communicate only with those persons registered on the voice communication server.

Concurrent with recent developments in public packet data communications networks such as the Internet, the telephone industry has been developing an enhanced telephone network, known as an Advanced Intelligent Network (AIN), for providing a wide array of new voice grade telephone service features. In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel signaling (CCS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCS link. The network offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

The AIN can play an instrumental role in supporting Internet telephony services. The AIN possesses many capabilities and mechanisms that may be readily adapted to complement or support voice calls over the Internet. For example, the digit collection and messaging capabilities of the AIN may be utilized to initiate Internet calls. The AIN allows various network elements (e.g., intelligent peripherals), other than the switch, to perform digit collection, thereby improving the performance of the network through distributed processing. In this manner, the network has the capability to allow the user to supply subscriber information via their DTMF phone while the switch handles the multiplicity of call sessions. Also, the AIN provides enhanced reliability of call sessions by employing signaling schemes like the SS7. The Message Transfer Part (MTP) of the SS7 architecture maintains the transfer of information even if elements in the network fail. In addition, advanced services, such as mobile services, "calling card" services, 800 services, operations and maintenance services, are supported by the AIN. Because the Internet enables lower cost long distance telephony service, there is a need to adapt the current PSTN to take advantage of this capability.

Modern telephone users have become accustomed to the many features (e.g., call-waiting, call-forwarding, conferencing, etc.) of the PSTN that are made possible by the deployment of the AIN. With the 800 service, the commercial industry has been able to attract and retain customers by offering information and support of its products and/or services to a geographically dispersed audience. The 800 service has gained tremendous popularity among commercial consumers. This service is now viewed as a necessary business function and is viable because the calls are free to the calling party. Consequently, there is a need to realize the same benefits of this AIN service over the Internet, which is made possible in part because of the ability to charge the called party—i.e., reverse bill.

With reverse billing, the called party is billed for all received calls; the calling party, thus, need not be burdened with long distance costs. This is analogous to the traditional collect call. The ability to provide reverse billing is desirable because it allows the user that subscribes to communicate with callers who are normally deterred by cost. In a business setting, this is especially important.

Reverse billing of calls over the Internet have been attempted by a few vendors and service providers. These efforts, however, have been on a small scale without much integration with the features and services of the PSTN. For example, because of the lack of integration, customers may receive separate bills for their IP voice calls and their POTS calls. Therefore, a method for reverse billing that seamlessly ties the PSTN and the Internet is needed. In addition, a need exists for integration of the AIN with the Internet to process voice calls over the PSTN and the packet switched infrastructure of the Internet. Specifically, a need exists to integrate the call processing capabilities of the AIN for Voice Over Internet Protocol (VoIP).

DISCLOSURE OF THE INVENTION

The present invention addresses the above stated needs by providing a capability to perform reverse billing of Internet telephone calls over a PSTN.

The present invention relates to providing an arrangement that enables reverse billing for Internet telephony calls. The arrangement will authenticate subscriber information, control routing of telephone calls over a public packet data network, and track billing information associated with the telephone calls. The billing information is stored and processed so that the called party can be accurately billed for all telephone calls initiated by other callers.

In one aspect, the present invention relates to a telecommunication system for supporting billing of a called subscriber unit for telephone calls through a system of interlinked computer networks. A plurality of separately located central office switching systems interconnected via trunk circuits selectively establishes telephone call connections. A computer terminal is coupled to one of the computer networks for receiving and initiating telephone calls. A voice station is coupled to one of the central office switching systems for receiving and initiating telephone calls. A control server is coupled to the system of interlinked computer networks for providing authentication services, controlling routing of telephone calls through the system of interlinked computer networks, and processing billing and usage information related to the called subscriber unit, in which the computer terminal, the voice station, or both can be designated as the called subscriber unit. The control server manages the telephone calls over the system of interlinked computer networks and tracks the billing and usage information of the called subscriber unit. One or more gateways is selectable by the control server for interfacing the system of interlinked computer networks to the plurality of separately located central office switching systems. This arrangement advantageously supports Internet telephony services over a PSTN; notably, the capability to reverse bill is realized.

Another aspect of the present invention relates to a telecommunication system for providing reverse billing capability, comprising a system of interlinked computer networks. A plurality of separately located central office switching systems interconnected via trunk circuits selectively establishes telephone call connections. A plurality of voice stations is coupled to one of the central office switching systems for receiving and initiating telephone calls. A control server is coupled to the system of interlinked computer networks for providing authentication services, controlling routing of telephone calls through the system of interlinked computer networks, and providing billing and usage information related to a called subscriber unit, wherein the called subscriber unit is at least one of the plurality of voice stations. The control server manages the telephone calls over the system of interlinked computer networks and tracks the billing and usage information of the called subscriber unit. An originating gateway is coupled to the control server for interfacing the system of interlinked computer networks to the plurality of separately located central office switching system. A terminating gateway is coupled to the control server for interfacing the system of interlinked computer networks to the plurality of separately located central office switching systems. The described network arrangement provides the capability to reverse bill Internet telephone calls.

The present invention relates to a telecommunication system for providing reverse billing capability, comprising a plurality of computer networks communicating via a Transmission Control Protocol/Internet Protocol (TCP/IP). A computer terminal is coupled to one of the computer networks. A web server communicates with the computer terminal configured for establishing a telephone call. A public switched telephone network (PSTN) provides Plain Old Telephone Service (POTS). A voice station receives POTS service and has a directory number. A called subscriber unit comprises the computer terminal or the voice station. A gateway interfaces the plurality of computer networks with the public switched telephone network. A control server is coupled to one of the plurality of computer networks comprising: a routing table used for routing the telephone call; a billing and usage database comprising records related to the called subscriber unit; and an authentication database comprising records associated with the called subscriber computer terminal and a predesignated profile of calling party stations. The control server manages the telephone calls over the plurality of computer networks and tracks the billing and usage information of the called subscriber unit. The called subscriber unit is registered with the control server. The above arrangement advantageously supports reverse billing of Internet telephone calls over the PSTN.

Another aspect of the invention relates to a telecommunication system for providing reverse billing capability comprising a plurality of computer networks communicating via a Transmission Control Protocol/Internet Protocol (TCP/IP). A public switched telephone network (PSTN) provides Plain Old Telephone Service (POTS) to at least two voice stations. Each of the voice stations has a directory number in which at least one of the voice stations is a called subscriber unit. A gateway interfaces the plurality of computer networks with the public switched telephone network. A control server is coupled to one of the plurality of computer networks comprising: a routing table used for routing the telephone call; a billing and usage database comprising records related to the called subscriber unit; and an authentication database comprising records associated with the called subscriber computer terminal and a predesignated profile of calling party stations. The control server manages the telephone calls between the two voice stations over the plurality of computer networks and tracks the billing and usage information of the called subscriber unit. The above method advantageously supports reverse billing of Internet telephone calls over the PSTN.

Yet another aspect of the invention relates to a method for providing reverse billing capability. The method comprises supplying a called subscriber information for establishing a telephone call communication between a computer terminal and a voice station to a web server; determining whether the called subscriber information is valid; providing routing information in response to the determining step. The routing information comprises an identification of a particular gateway among a plurality of gateways on the data network. The method further comprises initiating a communication session with the particular gateway; authenticating the communication session with the particular gateway; terminating the communication session based upon the authenticating step; and establishing the telephone call between the computer terminal and the voice station if the communication session with the particular gateway has not been terminated. Further, tracking billing and usage information associated with the telephone call is performed by a control server. The control server processes the billing and usage information to charge a called party for the telephone call. The above method advantageously supports reverse billing of Internet telephone calls.

Yet another aspect of the invention relates to a method for providing reverse billing capability to charge a called party account. The method comprises supplying called subscriber information to an originating gateway on a data network for a telephone call between a first voice station and a second voice station in which the called subscriber information is associated with the called party account and the first voice station or the second voice station. The method also comprises determining whether the called subscriber information is valid and, in response, providing routing information. The routing information comprises identification of a terminating gateway on the data network. The method further comprises establishing a communication session between the originating gateway and the terminating gateway; authenticating the communication session via a control server. The control server signals the terminating gateway to confirm authentication. In addition, the method comprises establishing the telephone call between the computer terminal and the voice station via the originating and terminating gateways; tracking billing and usage information associated with the established telephone call; and charging the called party account for the telephone call based upon the billing and usage information. The above method permits a called user to be billed for Internet telephone calls.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 4 is a timing diagram of a Phone originated call set up in accord with the present invention.

BEST MODE FOR CARRYING OUT THE INVENTION

The present invention accomplishes reverse billing of Internet voice calls, and thereby enables such advance services as personal 800 service. One arrangement, according to the preferred embodiment, provides a method to track billing and usage information associated with a called party for telephone calls over a public packet switched data network, such as the Internet, in conjunction with the public switched telephone network (PSTN). The reverse billing capability is particularly advantageous for supporting an 800 service or the like whereby the subscriber possesses a relatively inexpensive way to receive long distance calls.

The present invention concentrates on three scenarios that exist in the transport of voice communication over an Internet Protocol (IP) based network; e.g., the Internet or a corporate Intranet. An Intranet is essentially a private data network providing Internet types of services and supporting the TCP/IP protocol. Voice communication using IP has many labels. Some of these include voice over IP (VoIP), Internet telephony, IP telephony, Internet voice calls, etc.

These terms are used interchangably herein to indicate the deployment of voice services (POTS, facsimile) over an IP network.

The first scenario, which is perhaps the most common, is PC to voice communication. The term voice station is used herein to denote any customer premise equipment designed to receive telephony services, including analog and digital phone sets, cellular handsets, etc. In this scenario, the voice calls are initiated by the PC users, who are connected to the Internet, and extend to voice stations (e.g., telephones) serviced by the PSTN. The second scenario involves the voice stations placing calls that traverse the PSTN and the Internet to a PC user. The third scenario is voice station to voice station calls using the Internet as the communications backbone; e.g., for the interexchange portion of the call connection. The invention provides systems and methods for efficiently reverse billing in each scenario.

Figure 1:
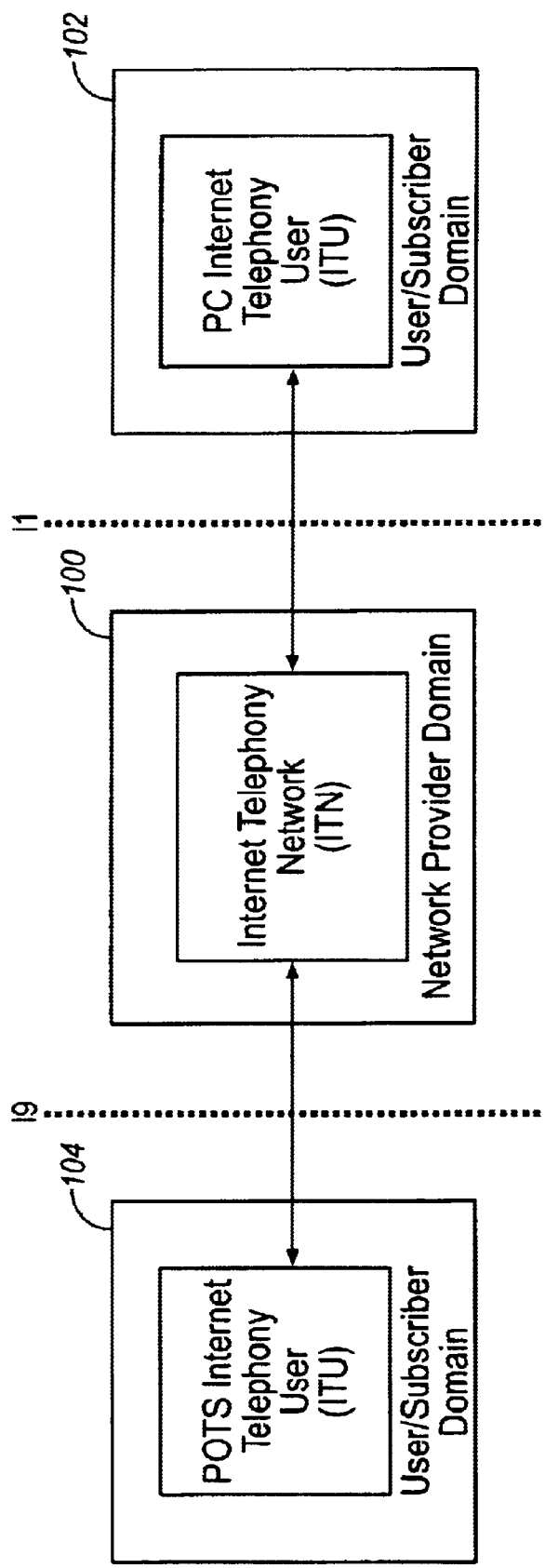
FIG. 1 is a diagram of an Internet Telephony architecture according to one embodiment of the invention.

FIG. 1 illustrates a conceptual model of the Internet Telephony Network, which integrates the PSTN with the Internet in accordance with the present invention. This model possesses a number of key objects and interfaces that enable reverse billing. The center block 100 is the Internet Telephony Network, which is shown in this illustration as managing a call between a PC and a POTS telephone. This ITN is in the Network Provider Domain and is responsible for all functions required of a traditional POTS network, i.e., call set-up, usage accounting, surveillance, etc. The capability of a POTS network to reverse bill is known in the art, and thus, will not be discussed in detail. The ITN spans both the circuit switched network (such as a Public Switched Telephone Network or PSTN) and the packet switched network (e.g., the Internet). The mechanics of the reverse billing process occur within this domain.

The PC Internet Telephony User (ITU or computer or PC user) and the called POTS Internet Telephony User (ITU or telephone user) are shown at 102 and 104 respectively in the User/Subscriber Domain. The POTS or PC operator in the User/Subscriber domain may assume the role of user, subscriber, or both. A user is defined as either a calling party or called party. A subscriber is a PC or telephone user who has registered with the network provider to enable Internet telephony service (i.e., Voice over IP). The interface between the PC user 104 and the 1TN is designated I1, while the interface between the POTS user and the PSTN is designated I9. I9 represents a standard analog or digital telephone interface (e.g., RJ-11 or RJ-45).

This model serves as a foundation for the VoIP call establishment and termination as well as the billing finctions of the present invention. Details of the model are discussed later.

Implementation of the above model, according to the preferred embodiment, should conform to established industry standards for VoIP. Of primary importance to the success of VoIP equipment manufacturers is their ability to develop products that will work with other manufacturers' devices. Otherwise, consumers will have to purchase equipment (and or software) from the same vendor to effectively communicate. However, being tied to a single vendor disadvantegously locks the consumer to the manufacturers' development cycle. Currently, the standard for interoperability is the International Telecommunications Union's (ITU) H.323, which is an umbrella specification that define numerous other standards regarding multimedia communication, including IP telephony.

The present invention integrates the public switched telephone network with the computer networked infrastructure of the Internet by providing a novel billing arrangement. The invention enables extension of certain advanced telephony services; for instance, the commercially popular 800 service, to telephone calls transported through the Internet. A discussion of the current state of the PSTN is presented below to facilitate understanding of the present invention.

The modern PSTN has been transformed by the emergence of the advanced intelligent network (AIN), whose distributed processing capabilities has stimulated the creation of many new telephony features and services. While the AIN concept continues to evolve, it has now matured to the point where AIN networks are widely used. AIN networks provide network operators with considerable flexibility and economy in structuring their product offerings and providing their customers (or subscribers) with numerous telephone conveniences and services. As a result, telephony services have become markedly sophisticated.

With AIN, many of the "intelligent" call processing finctions can be off loaded from the generic switches to peripheral or adjunct computer systems (e.g., service control point), thereby reducing the switches' processing burdens. The service control points (SCPs) assist the switches with the routing of calls and by providing data to implement customized calling features. The SCP is essentially a central control for the intelligent network. In an AIN network, the SCPs rely on peripheral platforms to provide auxiliary call processing capabilities when instructed to do so. In the intelligent network implementation, each SCP maintains a MultiServices Application Platform (MSAP) database, which contains call processing records (CPRS) for processing of calls to and from various subscribers to AIN type services.

Within the PSTN, there are the OSSs (241, 243 in FIG. 2A), which provide control functions as well as monitoring and usage accounting functions. The OSSs play a key role in the ability to reverse bill the called party once the control server 203 provides it the information. These OSS systems include provisioning systems to establish, update and maintain the profiles and other control data in the central offices, the SCPs and the IPs. The OSSs also include usage data processing systems for accumulating usage statistics and for processing usage data to create billing records.

Call processing records (CPRs) in the Multi-Services Application Platform (MSAP) database within each ISCP (Integrated SCP) are created and managed by a terminal system referred to as a service creation environment (SCE) and a service management system (SMS). Profile data may be loaded into memory in the switches by an automated system, such as Memory Administration Recent Change System (MARCH). MARCH qualifies the data, and if the data meets the relevant qualification criteria, MARCH transmits the data to the appropriate central office switch for entry into memory. The OSSs may also include a variety of data accumulation systems, such as a data distributor coupled to an SCP and a computer system serving in a revenue accounting office, for preparing usage statistics and/or calculating bills.

Copending Chang et al. application Ser. No. 08/904,117, attorney docket number 680–214, filed Jul. 13, 1997, discloses an easy, effective mechanism for telephone subscribers to interact with the various telephone network management systems (i.e., operations support systems (OSS)) 241, 243 shown in FIG. 2A, and thereby manage all of the control information that affects their telephone services and to obtain usage and billing related information regarding their telephone services via an Internet-web link. That application is incorporated by reference herein in its entirety.

Another key element of the AIN is the service switching point (SSP). A SSP capable (i.e., recognizes the full set of AIN triggers) central office switching system typically consists of a programmable digital switch with Common Channel Signaling (CCS) communications capabilities. Current telecommunications and data networks using CCS generally utilize the Signaling System 7 (SS7) protocol which is described in Section 6.5, LSSGR, Issue 2, July 1987, TR-TSY-000506, a module of TR-TSY-000064. One example of an SSP capable CO switch is a 5ESS type switch manufactured by Lucent Technologies; but other vendors, such as Northern Telecom and Seimens, manufacture comparable digital switches which could serve as the SSPs.

Figure 2A:
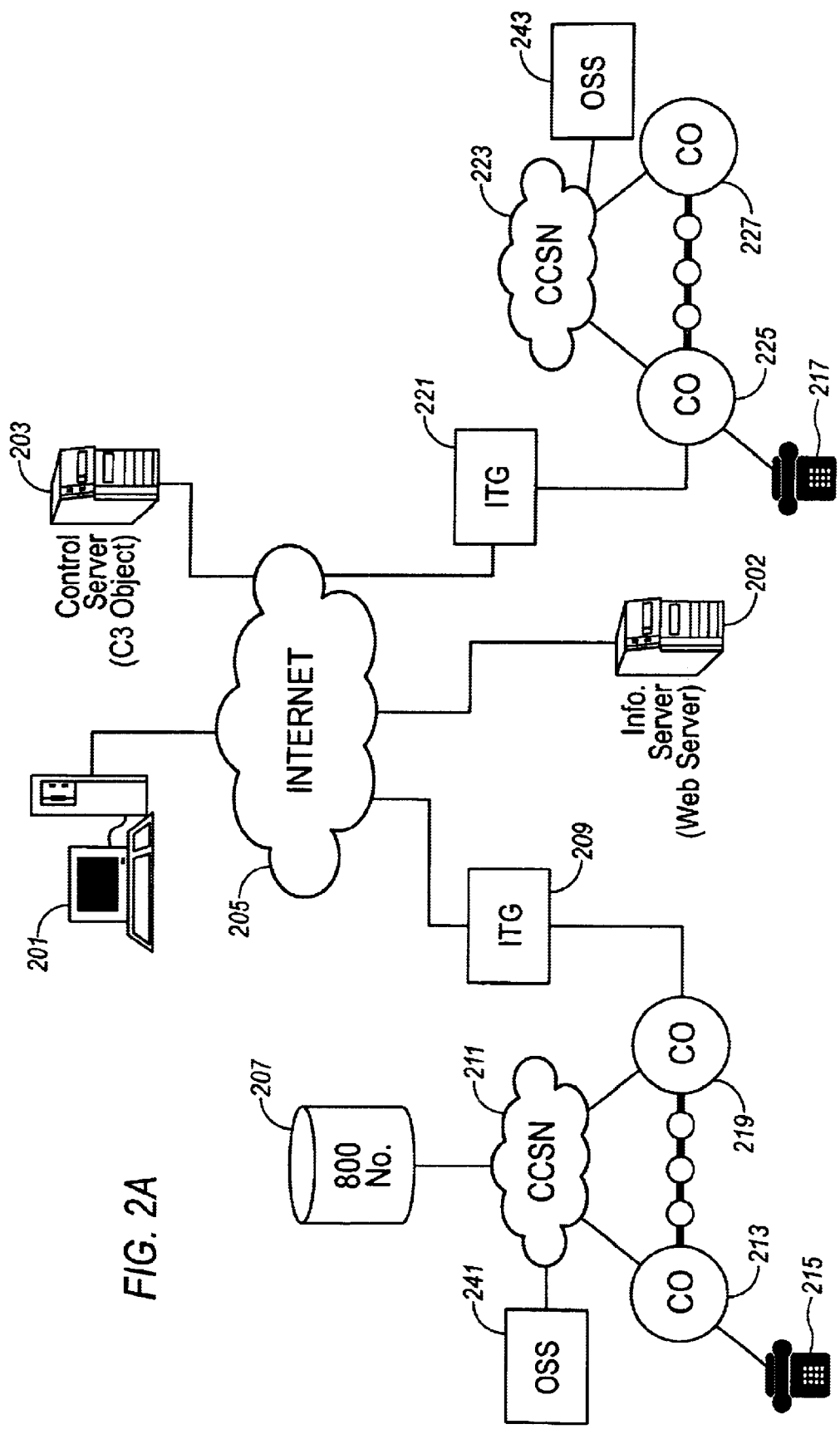
FIG. 2A is a diagram of a network arrangement consistent with the architecture of FIG. 1.

With reference to FIG. 2A, the COs 213, 219, 225, 227 (which may be of the SSP type) connect to a mated pair of local area STPs (not shown), which are a part of the CCSNs 211, 223. The operations support systems (OSSs) 241, 243 provide usage record details and account status information for customer accounts. The interaction between the control server 203 and these OSSs 241, 243, in one embodiment, supports the reverse billing capability of the present invention. The connections to the STPs are for signaling purposes. The links between the COs and the local area STP are typically SS7 type CCS interoffice data communication channels. One system for providing a Common Channel Signaling Network (CCSN) utilizes SS7 protocol in a private packet switched data network (not shown) connecting a number of network elements (e.g., SSPs, STPs, SCPS, etc.). In addition to providing call set signaling functions, the SS7 network also provides access to switching control points (SCP) used to permit line identification database (LIDB) (not shown) queries for 800 database 207 look-up for 800 services. Although not shown, the ITGs may communicate with the LIDB via in band signaling over a Feature Group D connection.

Class services also use the SS7 network to provide custom call features. The latest services using the SS7 network comprise AIN services, which utilizes SS7 links to access an Integrated Switching Control Point (ISCP) where AIN service functions are performed. The local area STPs are in turn connected to the regional STP via SS7 packet switched links. The regional STP also communicates with the SCP via a packet switched SS7 link. The STPs essentially comprise packet switches, designed to switch SS7 protocol packets.

The STP hierarchy can be expanded or contracted to as many levels as needed to serve any size area covered by the AIN and to service any number of stations and central office switches. Also, certain switching offices within the network, whether SSPs or not, may function primarily as tandem type offices providing connections between trunk circuits only.

The above described data signaling network between the SSP type central offices and the SCP is preferred, but other signaling networks could be used. For example, instead of the SS7 inks and STPs, a number of central office switches and an SCP could be linked for data communication by a token ring network. Also, the SSP capability may not always be available at the local office level, and several other implementations might be used to provide the requisite SSP capability.

FIG. 2A shows the preferred embodiment of the ITN that supports the three Internet telephony scenarios discussed earlier. The PC 201 has access to the Internet. The method of access is typically provided by dialing via a modem (not shown) to an Internet service provider (not shown), who has a node (not shown) in the Internet. The PC 201 must communicate with an information server (i.e., web server) 202 to establish an Internet telephone call. As will be explained later, the function of the web server 202 is that of the M1 Information Server object of FIG. 7. The web server typically is a server class PC or a minicomputer.

Voice stations 215, 217 receive plain old telephone service (POTS) via local central offices 213 and 225 respectively. The local COs 213, 225 communicate with the CCSN to switch voice calls to and from voice stations 215, 217. Remote CO 219 connects to an Internet Telephony Gateway (ITG) 209, providing a method of establishing a call between PC 201 and voice station 215. Details of this method are described later in the discussion of the call flows. Voice station 217 is wired to local CO 225, which is linked to ITG 221 for connection into the Internet.

Control server 203 performs a number of activities associated with Internet telephone call establishment. The control server 203 is integral in supporting the reverse billing capability. According to the detailed model of FIG. 5, the control server 203 corresponds to a C3 object of the model (described later), which supplies the services of authenticating the subscriber, controlling the routing of the telephone call, and processing of billing and usage information. The control server 203 effectively supplies authorization for the Internet telephone call.

As shown, the control server 203 attaches to the Internet and the CCSN 223. The Internet connection allows the web server 202 to supply the control server 203 with necessary data for call establishment (e.g., called subscriber identification). Additionally, the link to the CCSN 223 permits networking elements (not shown) within the CCSN to communicate with the control server 203 from the PSTN side. In this manner, the control server 203 may transfer billing information associated with a called subscriber to the management system of the AIN for charging the called subscriber.

Figure 2B:
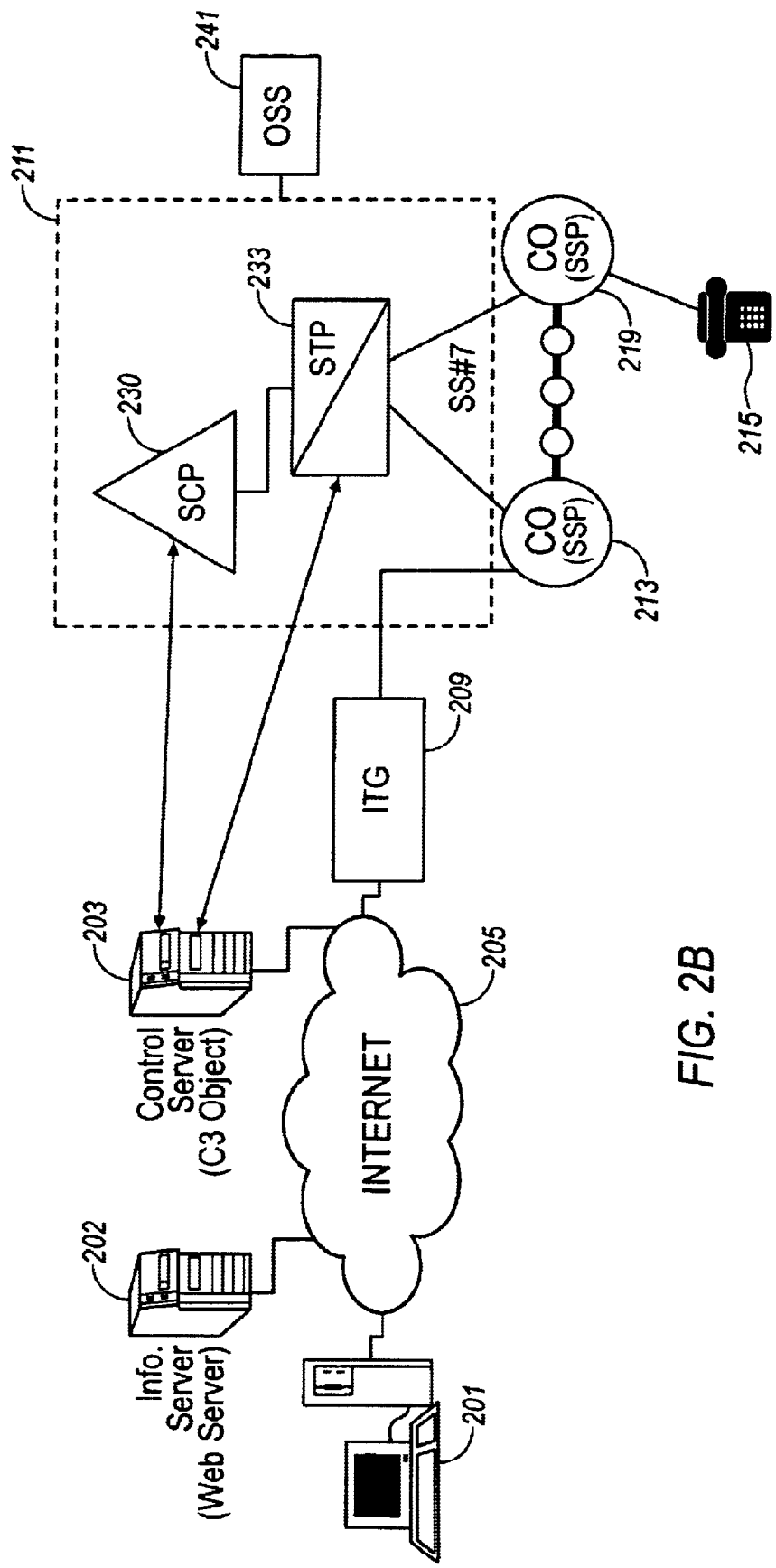
FIGS. 2B is a diagram detailing the Common Channel Signaling Network of FIG. 2A.

FIG. 2B shows the public switched telephone network of FIG. 2A in accord with the preferred embodiment. As mentioned in the earlier discussion of the AIN, the management system (not shown) supports the billing and accounting functions. Within the CCSN 211, there are at least two AIN elements, SCP 230 and STP 233. The communication between the control server 203 and the SCP 230 includes the transfer of called subscriber information. Access of such information by the SCP 230 permits the OSS 241 to process billing and usage information of the VoIP calls and charge the called subscriber.

As shown, SCP 230 may communicate directly with control server 203 to exchange signaling information. Alternatively, STP 233 may directly communicate with the control server 203. The exact choice of implementation depends upon availability of networking resources within those elements as well as the type of signaling information that is exchanged. It should be noted that central offices 213 and 219 are equipped with SSP capable switches to support AIN services. In the alternative, these COs 213 and 219 should have access to a SSP capable CO so that AIN triggers can be appropriately relayed.

Figure 3:
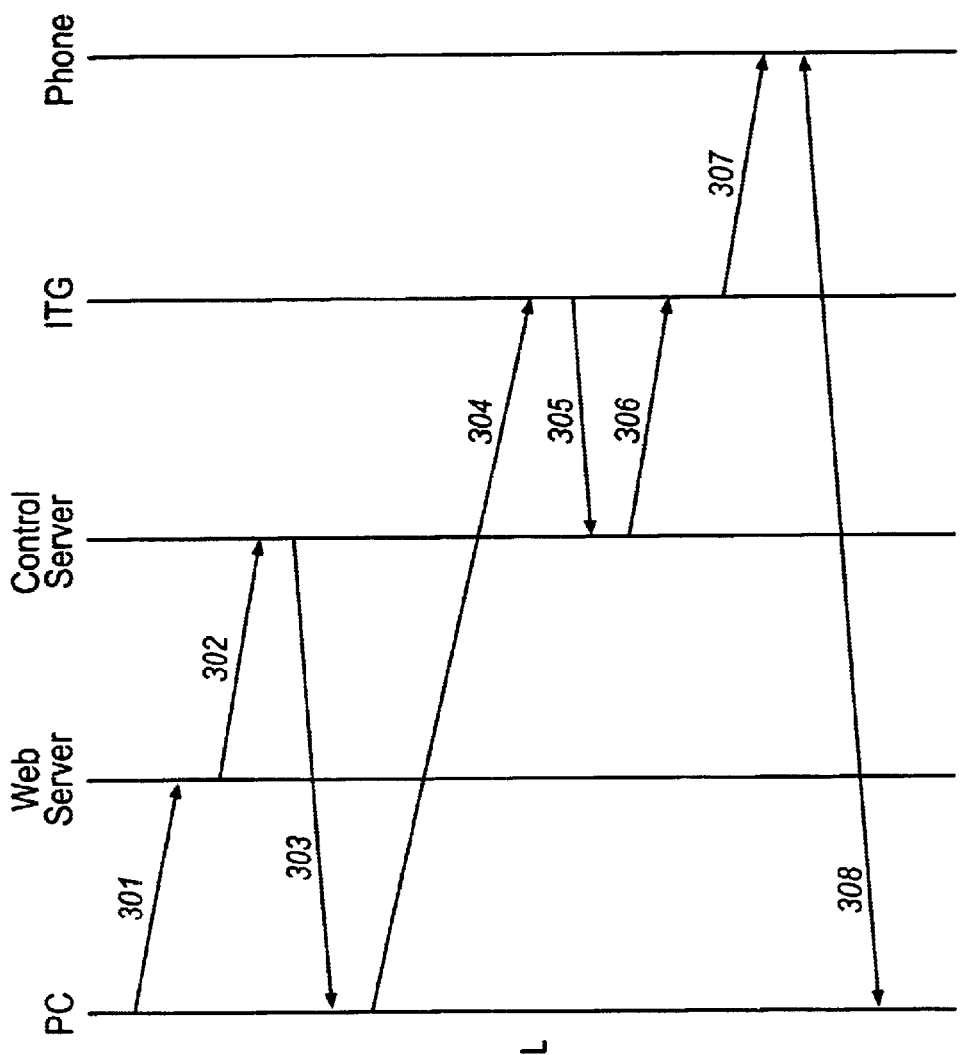
FIG. 3 is a timing diagram of a PC to Phone call setup in accord with the present invention.

FIG. 3 shows the call flow of a PC to phone call establishment, corresponding to the network elements of FIGS. 2A and 2B. PC 201, using a conventional web browser (e.g., Netscape Navigator 4.0, Microsoft Explorer 4.0), communicates with a web server 202 via the Internet 205. The web page resident in the web server 202 prompts for a subscriber identification. This subscriber ID may be the called party's directory number or simply an identifying alphanumeric string (e.g., subscriber's name, account number, etc.), which is translated to an actual directory number of the called party.

Once the web server receives the subscriber ID from the PC 205, it relays the information to the control server 203. At this point, the control server authenticates the subscriber ID by checking a subscriber profile database in step 302. If the subscriber ID is valid, the control server 203 authorizes the call by supplying routing information (i.e., address of the ITG 209) to the PC (step 303). Using the ITG address (i.e., telephone number), the PC 201 establishes a telephony session with the ITG 209, according to step 304. Once the ITG 209 is contacted, the ITG 209 checks with the control server 203 to obtain authorization for the telephone call.

The control server 203 in turn signals that the call is authorized after making appropriate inquiries regarding the subscriber ID (step 306). After proper authorization is received, the ITG 209 signals to the voice station 215 (e.g., phone). Note that even though the PC 201 may be anywhere in the world, the ITG 209 typically sets up a local call to the phone 215. Thus, the subscriber avoids toll charges that would have been incurred if the call were routed using strictly the PSTN. Once off-hook, the voice station 215 begins communicating with the PC 201 (step 308).

The duration of the call is monitored by the control server 203. After the call session terminates by one of the parties hanging up, the billing record is captured by the control server 203 and is associated with the subscriber, in this case the called party associated with PC 201. This information may then be transferred to the OSSs within the PSTN via one of the ITGs 209, 211 for reverse bill processing.

In the actual implementation of reverse billing of VoIP calls, two billing approaches are possible. In the case where the provider of Internet telephony service is independent from the local exchange carrier (LEC), the provider may utilize information within the ITG 209 and the control server 203 to process a billing statement to the called subscriber. This statement would be separate from the phone bill from the LEC; or the separate statement may be included as an insert to the statement from the LEC, if the provider and LEC made such an arrangement.

The other case is a more integrated approach to billing, in accord with the preferred embodiment of the present invention. The control server 203 would transfer billing information via the CCSN to the OSS. The OSS would consolidate the billings of the called subscriber to form a single statement, detailing POTS charges and Internet call charges as well as any other telecommunications charges.

The call flow of FIG. 3 addresses only the first scenario of PC to phone call establishiment. The second and third scenarios (Phone to Phone, and Phone to PC, respectively) are illustrated in the call flow of FIG. 4. FIG. 4 comports with the network diagram of FIG. 2A, in which, for purposes of explanation, ITG 209 can be considered to be the originating ITG and ITG 221 the terminating ITG. Note that in the case of phone to phone communication, two gateways are necessary to interface the phone system with the data network. In contrast, a phone to PC scenario required only the originating ITG 209 because once the control server 203 authenticates, it sends the call through directly to the Internet 205.

In the first step 401, voice station 215 dials up the originating ITG 209. Accordingly, the calling party must know the directory number of the ITG 209. In the alternative, the calling party may be assigned a code that is passed from the local CO 213 to the ITG 209. In the preferred embodiment, the called subscriber possesses a "personal" number such as an 800 or 888 number, which a calling party who dials the toll-free number is routed to the originating ITG 209. In the next step 402, originating ITG 209 prompts for a subscriber ID from the calling voice station 215. Using the DTMF keys, the phone 215 supplies the requested information. This information is forward by the originating ITG 209 to control server 203 for authentication and subsequent authorization of the Internet telephone call establishment (404). As discussed with respect to FIG. 3, the control server 203 is responsible for tracking usage and billing information upon termination of the call. In steps 405 and 406, the control server 203 concurrently provides the address of the terminating ITG 221 to the originating ITG 209, and informs the terminating ITG 221 that the call is authorized. However, if the called unit is a PC, then the control server may set up the connection directly.

After steps 405 and 406, the control server 203 may optionally communicate with the CCSN 223 over an SS7 link to determine whether the called unit (PC 201 or phone 217) is busy so that other call processing events may be triggered (step 412). For example, if the called unit is busy, the control server 203 may terminate the call establishment process and redirect the calling party to leave a message. If this option is exercised in the case of the PC called unit, then the connection setup step discussed 405 occurs after this optional step. Additionally, where the called unit is a phone, the terminating ITG 221 may perform the call busy inquiry (step 413). Although it is preferable to employ the CCSN 223 to determine whether the called unit is busy, in band signaling (e.g., Feature Group D) can also be used if an SS7 link is not available.

Once the control server 203 supplies the originating ITG 209 with the address of the terminating ITG 221, the originating ITG 209 establishes a session with the specified terminating ITG 221 (step 407). In step 408, the terminating ITG 221 then verifies with the control server 203 that indeed proper authorization exists to complete the call establishment. The control server 203 next confirms that authorization has been granted (step 409). The terminating ITG 221 then places the call request through to the phone 217. Once the called unit acknowledges or "picks up", the call establishment is complete. After the call connection is torn down, the control server 203 records the duration of the call for billing to the called party. The reverse billing process is similar to that discussed with respect to FIG. 3.

The mechanics of the processes and activities discussed above can be achieved using the conceptual model of FIG. 1. Certain details of the model are discussed below, constituting one embodiment of the present invention A more exhaustive description of the model is described in commonly assigned Voit et al. application Ser. No. 09/014,286, attorney docket number 680-212F, filed Jan. 27, 1998. That application is incorporated by reference herein in its entirety.

Figure 5:
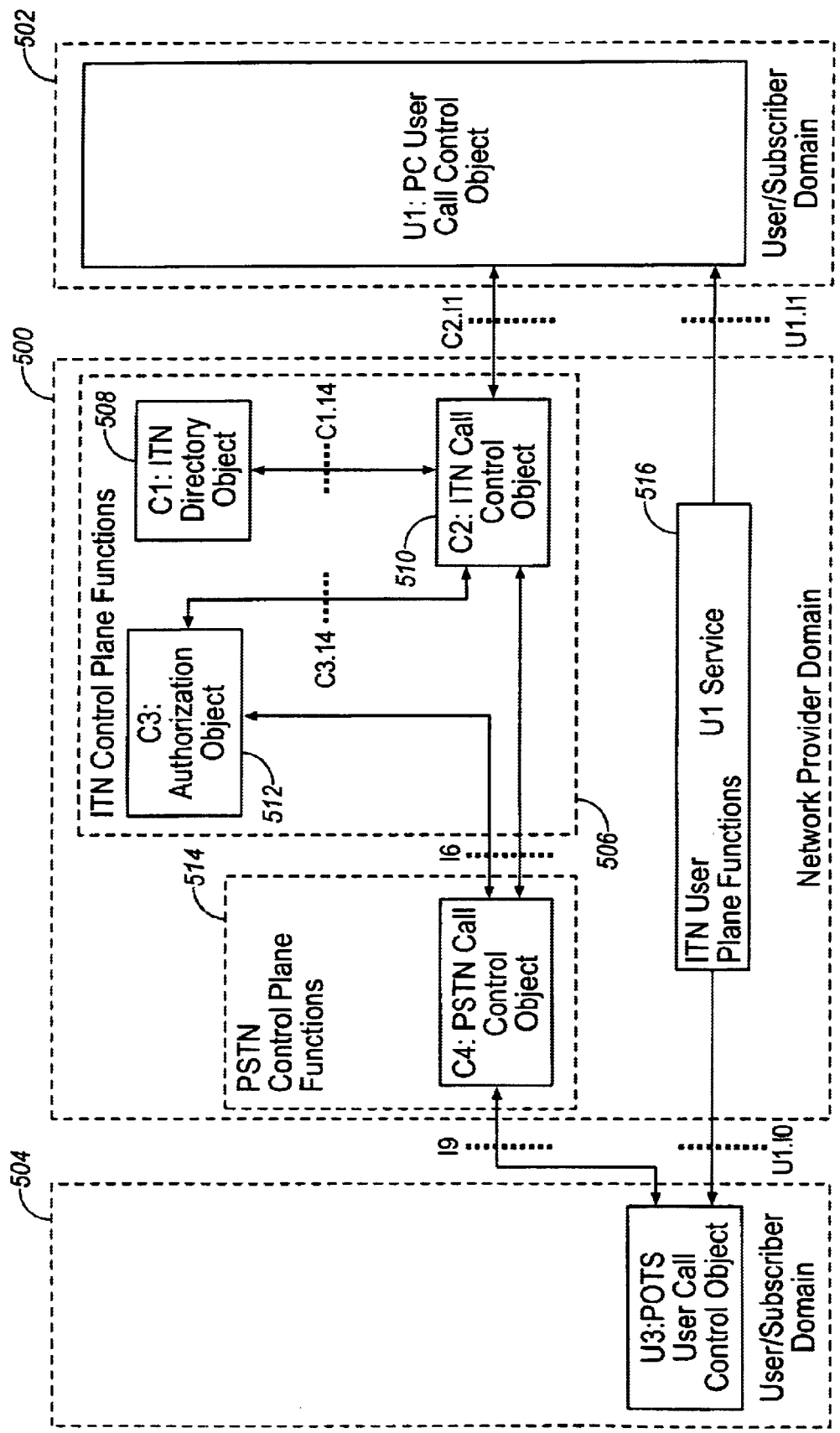
FIG. 5 is a diagram of one embodiment of a preferred architectural implementation showing interfaces between IP network elements.

FIG. 5 is a diagram showing the interfaces between IP network elements in one architectural implementation. The key objects to execute reverse billing include the C3 and C4 objects. The term "object" generally refers to a major process that has been identified within the functional specifications of the system. An interface is a communications path between two objects. The details of these objects and interfaces are discussed later. At 500 there is shown the network provider domain, which includes the PSTN Control Plane Functions 514 and the ITN Control Plane Functions 506. The PC User System Block 502 in the user/subscriber domain includes the U1 PC User Call Control Object. At 504 there is shown the U3 POTS Service User, which is a part of the user/subscriber domain. The ITN Control Plane Functions 506 are those which establish and tear-down communication paths across the ITN User Plane Functions 516. Three Control Plane Objects are illustrated, namely: the Internet Telephony Gateway Directory Object (C1); the Internet Telephone call Control Object (C2); and the Internet Telephonys Authorization and Usage Recording Object (C3). These objects are shown respectively at 508, 510, and 512. The PSTN Call Control Object C4 is linked to the C3 object via the I6 interface.

The interaction among these objects and interfaces under the PC to voice station call scenario is described as follows, in the context of the reverse billing capability. The U1 PC User Call Control Object attempts to establish a VoIP call by sending a call establishment request to the C2 object 510 over the C2.I1 interface. As indicate previously, the C2 object 510 is typically a web server. The C2 object 510 interfaces via C3.I4 to check whether the requesting U1 object is authorized to place the call.

After receiving authorization, the C2 object 510 inquires with the C1 Directory Object 508 to retrieve addressing information on the C4 PSTN Call Control Object, using interface 16. The same interface 16 permits the C4 object to communicate with the C3 object to confirm authorization if necessary. The C4 object then instruct the PSTN to allow the call connection. Once the call is established, the VoIP session is monitored by the U1 service. The U3 POTS User Call Control Object utilizes the U1.I0 interface to link to the U1 Service. At the other end, the U1 PC User Call Control Object interfaces the U1 Service over U1.I1. The C3 object maintains call usage and billing information throughout the entire call connection—from establishment to termination—so that the called voice station can be properly billed. Although, the above scenario describes a PC to Phone scenario, it will be readily realized that the model (in FIG. 5) supports the other two scenarios: phone to PC, and phone to phone.

In the case of a phone to phone call, the U3 POTS Object signals to the C4 object within the PSTN Control Plane Functions 514 over the PSTN. Although not shown, the U3 object places the call to another U3 object. Each U3 object utilizes the I9 interface to communicate with the C4 Control object, which in turn interacts with the ITN Control Plane Function 506. As mentioned in the previous discussion, these functions include call usage and billing information by the C3 object so that the called party associated with the U3 object is billed appropriately.

For the phone to PC scenario, after communication is established with the C4 object by the U3 user object, the interaction with the ITN Control Plane Functions 506 now involves the C2 object establishing a session with the U1 PC User Call Control Object over the C2.I1 interface. The reverse billing capability of the C3 object continues to be performed as in the other scenarios.

The above discussion regarding the three VoIP call scenarios focused on the call establishment flows. These flows involve a number of important functional objects and interfaces for the successful execution of reverse billing. Within the network provider domain 500, interface I6 serves to bridge communication between the PSTN and the Internet. Interfaces C3.I4 and C1.I4 are strictly within the Internet. All other interfaces are to the users. These objects and interfaces are detailed below.

The C3 object represents the network element required in this architecture to perform called customer (subscriber) authentication, call authorization, usage accounting, and usage pricing for a particular user's customer account. In accord with the present invention, control server 203 shown in FIGS. 2A and 2B provides the C3 functionality. The usage accounting and usage pricing capabilities of the C3 object provide a way to track billing information to effect reverse billing. The C3 object has access to all the information to properly charge a called party. The C3 object ensures coordination between user authorization and usage recording for a single user's customer account. C3 also responds to external requests for that information. For a consolidated billing statement (as discussed earlier), the C3 object transfers information to the OSS of the PSTN via the C4 object. The C3 object can respond to real time requests from external operations support systems (OSSs) for usage record details and account status information for the called subscriber.

In addition to enhancing the reverse billing capability, bundling of usage recording, pricing, and authorization into one logical object, as is the case with the control server implementation, it is possible to eliminate the conventional separation between authorization and billing processes and significantly reduce the potential for fraud in a regionally deployed system. Because a single logical database is used to manage customer authentication, authorization, and usage pricing for the network, a transaction-based approach to updating data is possible. This minimizes opportunities for fraud based on exploitation of the conventional temporary inconsistencies which are encountered with partitioned or replicated databases. There is no requirement that this unitary logical object be implemented as a single physical system.

The C3 object may be implemented in a manner such that multiple sites maintain their own database servers in which no single site on the Internet is in possession of all of the authentication, authorization, usage pricing, and account data. The overall data constitutes a distributed database which forms a unitary logical object which relies on the database servers at the individual sites. Operation is such that a local C3 database or server receives a request for data. If the local server database cannot locate the requested information it sends a request to a second database server asking it to locate the information and send the results back to the requester. The second database server locates the information and sends a message to the requester. If the second database server cannot locate the information in its database it (or the local server database) sends a similar request to the next database server until the desired information is located. Alternatively, the account number may be coded so as to indicate the proper database instance. Database servers with this capability are described in detail in the common assignee's copending Sistanizadeh Application Serial No. 08/634,544, attorney docket number 680-170, filed Apr. 18, 1996. That application is incorporated by reference herein in its entirety.

The C3 object is invoked during a call when an authorization request is relayed over the interface C3.I4. This interface is responsible for allowing an authorization of ITG usage by a service subscriber (i.e., called party), and for maintaining the current state of a subscriber's connections within C3, as well as passing ITG generated usage records from C2 to C3 in real time. In the embodiment of FIGS. 2A and 2B, the ITGs 209, 221 represent the C2 object. Communication through the C3.I4 interface is preferably encrypted and secure. The authorization request relayed over C3.I4 typically consists of an account number and password provided by the PC User to be authenticated by C3. At this point C3 checks the account password and available account balance. If the password is correct and the account remaining balance permits the call to be established, then C3 responds affirmatively to C2. C3 also retains data indicating that a call associated with that account is in progress. In such an architecture, mutual authentication of C2 and C3, and a secure transaction between them is preferred.

In providing the authorization, C3 evaluates the customer (i.e., subscriber) account status to determine if there are multiple connections currently in service (possibly across multiple ITGs). It should be appreciated that while FIG. 5 shows only a single gateway (not shown) between a PC user and the ITN (via the PSTN), a plurality of gateways exist serving the various regional areas from which subscribers may request service. With the state information obtained from the C3 status evaluation the authorization system may ensure that only one call per account is being handled by the network, and/or ensure that the maximum billing limit is not being circumvented by multiple concurrent sessions. If this precaution is not provided a second caller using the same account and password might receive authorization for a call prior to the posting of the first caller's usage record. Optionally, in order to handle low billing amount availability without denying a call completely, C3 can respond to C2 with a maximum allowable call duration.

Another feature is that C3 may reserve a certain remaining balance on the account for the call so that additional calls related to that account will not result in exceeding that account's limit. C3 may return the pricing algorithm for the usage to C2 which will pass it on to the subscriber. In this way the subscriber knows the initial charge and ongoing per minute rate for the requested usage. This is particularly important when C2 is owned by a different company than C3 (which is a likely scenario in actual implementation), and the subscriber wants to know the overall rates that will be charged prior to completing the call. In the case of a PC subscriber, the PC should be configured to receive and utilize the algorithm, and display pricing to the user. The PC is also able to present the total charge being incurred by the user as time goes on during the call. In the case of a phone subscriber, he may be supplied with such information via voice prompts from the AIN, for instance.

After the completion of the call, the C3 object is also responsible for accepting usage recording data associated with the called party from C2, pricing the usage, and decrementing that priced amount from a customer's available balance. C3 then logs the final call data Preferably C2 also logs and maintains the call detail information. This feature is very useful in the situation where C2 and the C3 database objects are owned by different companies. In this case, the database object data can be used by its owner to manage the customer account. In addition, the C2 data can be used by the owner of the C2 object to charge the C3 database object for the completion of the call over its facilities. In effect this C2 data becomes the basis for a usage based settlement interface between carriers.

Preferably the C3 system is partitioned. Such a partition may be made by a field identifying the carrier owning the customer account, a sub-field within the customer account number (such as NPA-NXX), the customer's telephone number, the customer's e-mail domain name, the customer's originating IP address, or some other field. Each partitioned database may then be placed on its own physical system on a geographical or other basis. With such a partitioned customer account data architecture, the domain of all managed accounts may be divided into efficiently implementable sub-groups. Accordingly, reverse billing of the called customer is greatly facilitated.

In a basic configuration the Internet Telephony Gateway Directory 1526 determines which E.164 addresses (i.e., telephone numbers) are served within the terminating footprint of a particular ITG. The management of the terminating footprint may be in the form of NPA-NXX ranges which relate to an IP address for a single ITG. When queried with a "called" telephone number by the PC Call Control Object, the C1 object returns the IP address of the Internet Telephony Gateway (ITG) that serves the called telephone number.

In a global sense there will be multiple directory objects owned by a plurality of companies serving different geographical areas, as well as serving overlapping and/or the same area. These distributed directory objects may be linked together in a hierarchical relationship to be subject to interrogation by other directories so as to enable a system wide gateway address search. For this purpose the distributed directories may be considered to constitute a unitary logical object in the manner described for the C3 authorization, usage and control object.

According to one aspect of the invention, direct signaling between the directory object and gateways is enabled. This permits the directory to query the gateways as to their status, the current availability of ports, the available bandwidth, the possibility of bandwidth and/or route reservation, costs, and other operational capabilities. The directory is able to monitor gateway capabilities and availability, to query as to specific calls, and to arrange reservations in real time. In view of the fact that gateway owners are providing availability to the gateways for profit, it is in the interest of the owner to furnish maximum information and even to advertise the capabilities of their facilities. When this new directory to gateway signaling interface is coupled with the capabilities of the enhanced directory object C1 it makes possible the fulfillment of a large variety of the previously outlined objectives.

The C1 directory object which, in its enhanced implementation, will be queried in order to resolve which C2 gateway control object is to be chosen for setting up a particular call or communication path. C1.I4 represents a new interface which will allow a directory system to acquire the state of multiple gateway control objects or ITGs in order to assess their current states and best distribute calls between them. In this way the PC user may know the initial charge and ongoing per minute rate for the requested usage.

The U1 PC Call Control Object 502 is able to identify a loss of voice content packets, or a continuous stream of format errors in the encoded voice data incoming on the U1.I1 interface (see FIG. 5). If such a condition is found and there has been no corresponding signaling at the control plane level, U1 will notify C2 to pull down the connection and perform any necessary clean up tasks via the C2.I1 interface (i.e., Internet Telephony Call Management Interface). C2.I1 is an external interface which is responsible for PC to Internet Telephony Gateway signaling for call establishment and tear-down.

The Internet Telephony Packetized Voice Interface (U1.I1) is an external interface which is responsible for transporting Vocoded, packetized voice segments across the Internet 205. This compressed voice interface, U1.I1 (as in FIG. 5), preferably communicates via UDP (User Datagram Protocol), however, RTP (Routing Table Protocol) on top of UDP is also an option. If RTP is used, the client software should validate that it is a valid option over the existing IP network. If RTP is selected, and communication over the IP Access network is performed with a PPP link, RTP header compression should be supported in order to reduce the required IP Access network bandwidth.

Although FIG. 5 depicts a single directory object C1, in an actual, large scale deployment, the directory object C1 represents a number of directory server systems in a hierarchical arrangement. Each directory server system (not shown) would support a region or segment of a public packet data network or IP Routed Network and would provide translations and conditional analysis processing of numbers corresponding to addresses residing within the segment served. Any computer or PC on the segment requesting translation would first query the directory server system serving that segment. If the number was not one associated with that server, the directory server would communicate through the hierarchy of such servers to relay the query to the appropriate server for processing. After processing, the server would provide the destination ITG address and any associated information in the reply back to the querying device. Also, each directory server in a given area could be duplicated, for redundancy.

It should be noted that any number of useful telecommunications functions can be performed by controlling the IP address and/or other routing information returned as a result of the conditional analysis performed by the directory server. The IP address and/or other routing information returned to the caller is determined by customized routing control records (RCRs) stored in a database in the directory server. These routing programs can provide a wide range of customized routing services, in a manner similar to the services provided by call processing records used in the AIN telephone network.

Figure 6:
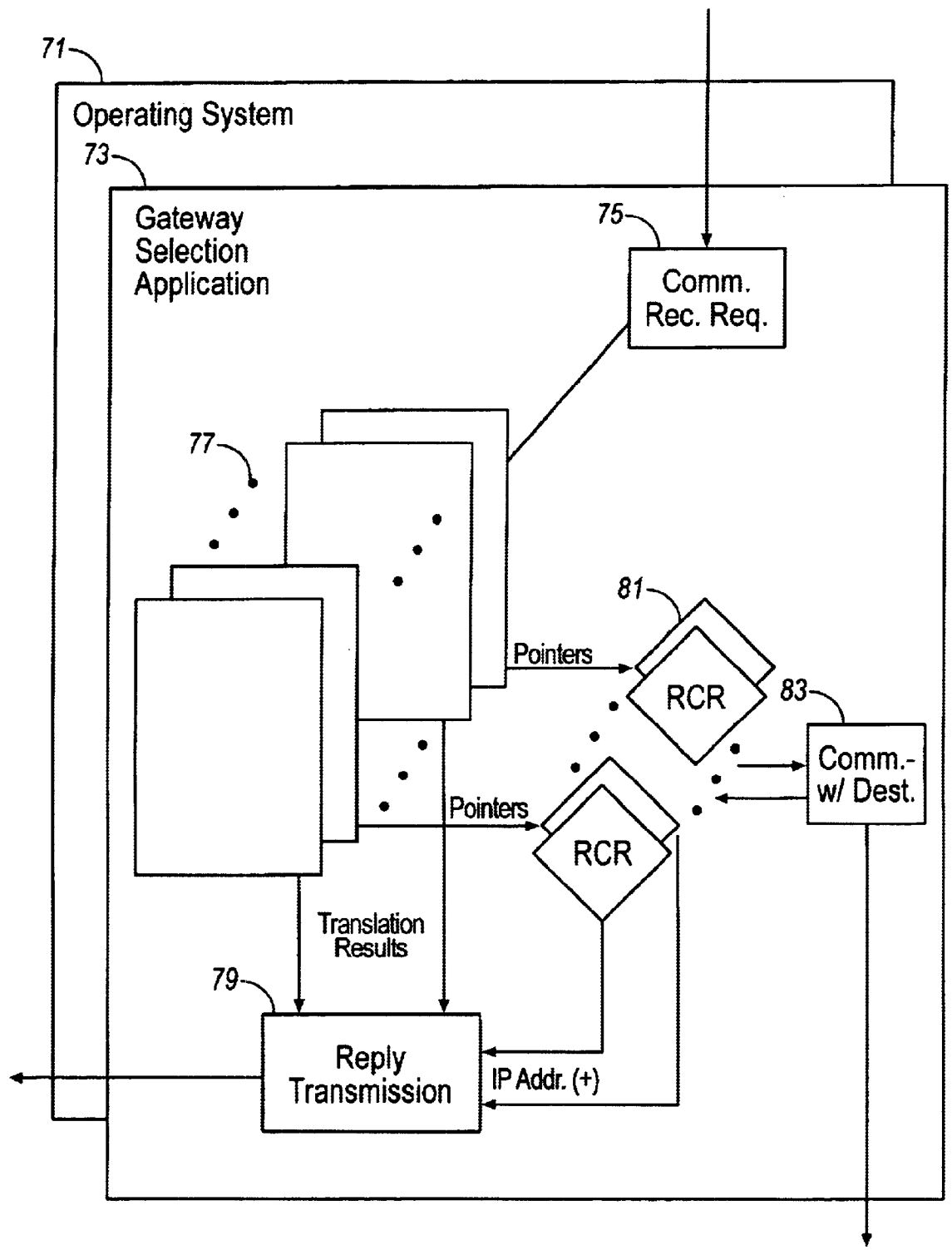
FIG. 6 diagrammatically illustrates one possible organization of the software for an enhanced directory object.

FIG. 6 provides an illustration of one possible organization of the software for the directory server C1 (FIG. 5), for implementing the enhanced operations as described in one embodiment. The computer of the enhanced directory server runs a standard operating system 71, such as UNIX. The operating system facilitates execution of one or more applications. One of the applications that will run on the computer of the directory server 1526 is a gateway selection application 73. The gateway selection application 73 includes executable code facilitating the actual processing. The executable code permits access to both translation tables and routing metrics 77 as well as routing control records (RCRs) 81 stored in a database within the storage system portion of the directory server 51. The executable code of application 73 may also trigger several communication routines 75, 79 and 83.

More specifically, when the computer of the directory server 1526 receives a "query" or request for gateway selection, the operating system 71 passes the request from the IP interface to the communication routine 75 of the application 73. The communication routine extracts the appropriate information from the query message, such as the address of the requesting terminal device (i.e., PC or phone) and the name that the address or telephone number of the terminal device which has been identified for connection. The communication routine may also extract any commands as to routing which the caller specifies. These may include least customer cost routing, reservable routing, specified bandwidth routing, specified carrier routing, or the like.

The gateway selection or directory processing application 73 can access a series of translation tables as well as routing metrics 77. The routing metrics 77 may be based upon, for example, cost criteria, or time of day and point of origin of the telephony call. This capability allows the paying called party to better manage telecommunication costs by effectively screening the calling parties. Some of the tables will simply translate called numbers into IP addresses of the most proximate gateways having a footprint which includes the number. The routing metrics are routines or methods by which routing algorithms determine that one route is better than another. This information is stored in tables which may include reliability, delay bandwidth load, maximum transmission units (MTUs), communication costs, hop count, available ports, reservability, and the like.

The product of the translation or routing metric will result in an IP address. The directory processing application 73 will supply the resulting IP gateway address and any related instructions or commands produced by the operation to a communication routine 79 for transmission of a reply message to the terminal device that requested the translation. The application 73 also provides the address of that terminal device to the reply transmission routine 79. In response, the routine 79 will formulate an IP reply message containing the terminal device address as the destination address and containing the IP address produced by the translation process as message data. The reply transmission routine 79 forwards the message through operating system 71 and the IP interface for transmission through the public packet data network or Internet/Intranet to the requesting terminal device. The requesting terminal device then initiates the desired communication using the gateway address.

Certain parties or customers will desire and subscribe to a variety of routing services requiring conditional analysis type processing. For each of those customers, the directory server 1526 will store a routing control record (RCR) 81. For each number associated with such a customer, the translation tables 77 will store a pointer pointing to the routing control record (RCR) 81 that controls that customer's routing service.

The directory processing application 73 will receive a query in the manner discussed above. However, when the application accesses the translation table with the number associated with a customer having conditional analysis based service, the translation will return a pointer identifying the controlling RCR. The directory processing application 73 then executes a conditional analysis routine utilizing the identified RCR 81. The conditional analyses defined by the RCRs vary considerably, depending on the customized routing service selected by each customer. In the simplest form, the RCR specifies a set of conditions or criteria and two or more alternate procedures, depending on which criteria are satisfied by the current call or directory request query. For example, the RCR may specify alternate procedures for different times, or for different addresses of the terminal which the customer used to request the translation. In these cases, the directory processing application 73 compares call or query related parameters to the criteria in the RCR 81 and obtains the gateway destination address corresponding to the parameters of the current call or translation query.

Figure 7:
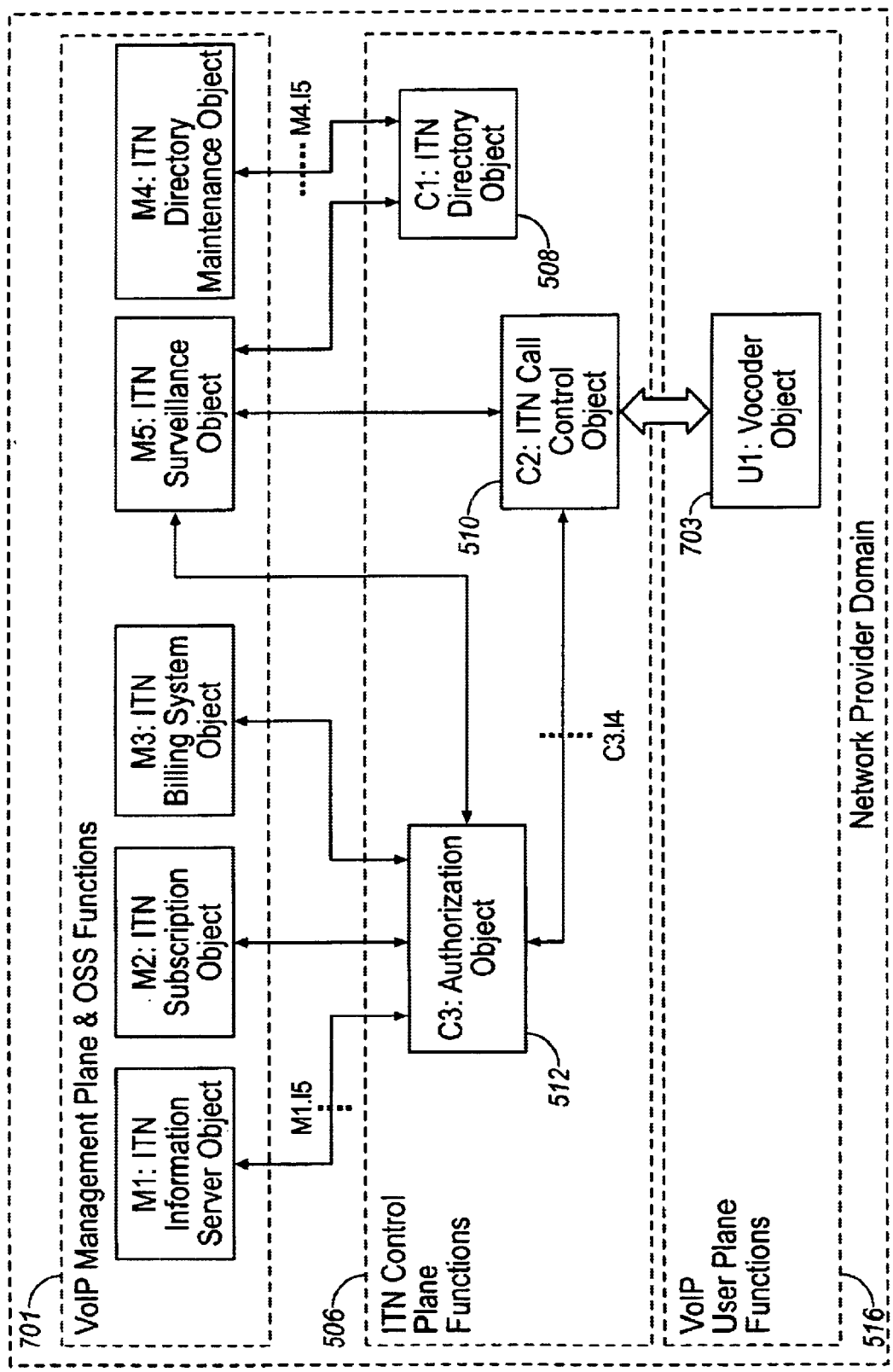
FIG. 7 illustrates the VoIP objects and interface relationships which have been defined between internal ITN objects.
Figure 8:
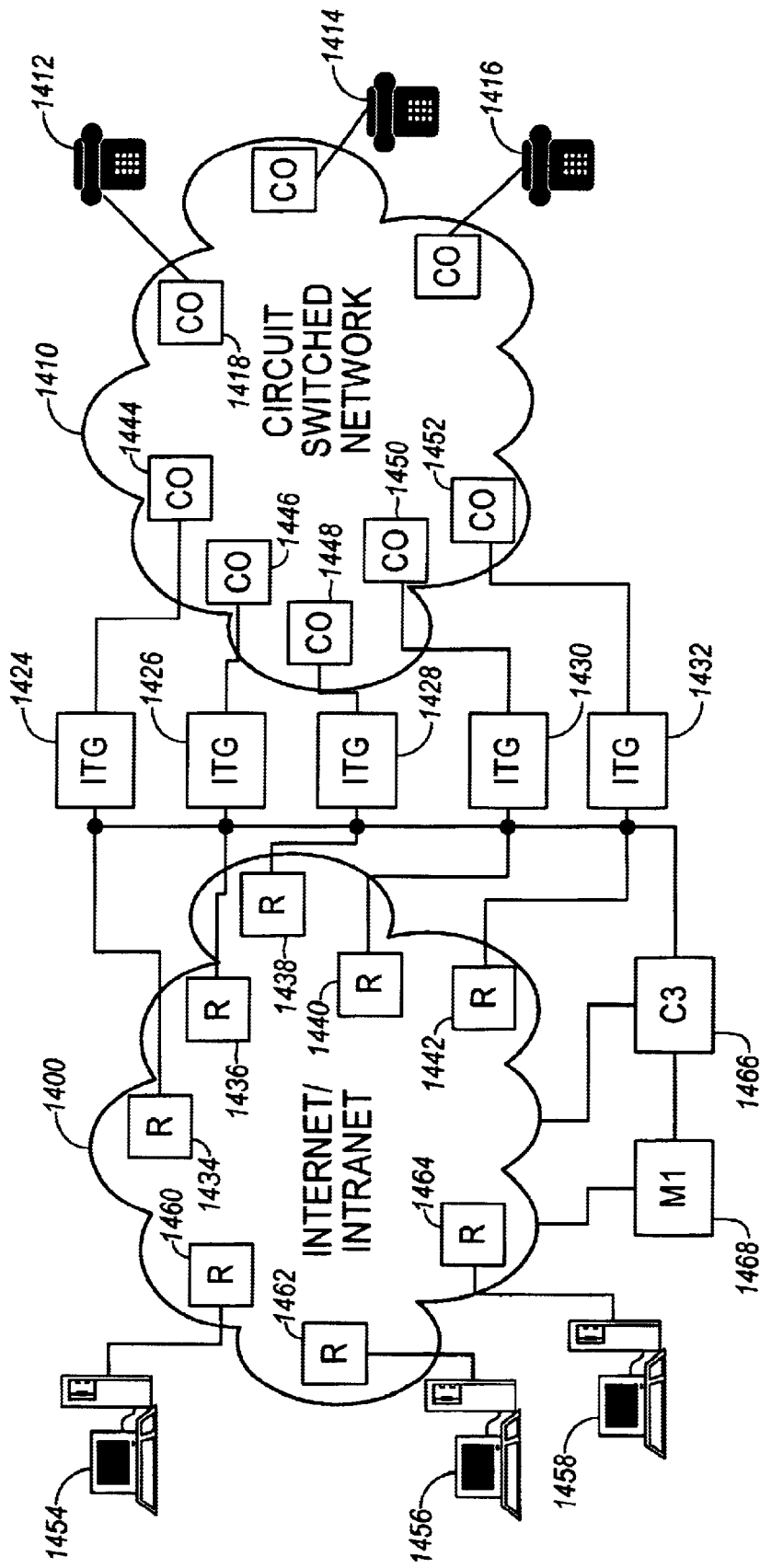
FIG. 8 is a diagram illustrating another aspect of the invention showing an architecture wherein a separate intermediary information server provides substantially real time retrieval of account information across the entire communication system.

FIG. 7 shows the authorization and usage object C3 connected to an Information Server Object M1 in the VoIP management plane. The information flow between the C3 and M1 objects is crucial to the accurate tracking of the called party account. The information flow between the C3 and M1 objects is crucial to the accurate management of the called party account. As indicated earlier, the web server of FIGS. 2A and 2B corresponds to the Information Server Object M1. This information and feedback object M1 comprises a server separate from the C3 authorization and usage object but connected to the C3 control plane object via the M1.I5 interface between the ITN Management Plane 701 and ITN Control Plane 506 finctions. The M1 object serves as an HTML interface to the VoIP network for subscribers to the service.

Operationally the M1 Object interface is accessible via various commercial web browsers. On any customer specific request for usage records or account balance, a PC user will have to provide within the query the same account number and password which is used for call establishment. This information will be validated by C3 before fulfilling the request, and thereby enabling the C3 object to attribute the cost of the VoIP call to the called party. The PC user, using a commercial browser accesses the information server. The information server validates the password and obtains the information from the authorization, usage and account object C3 via M1.I5, and presents the information to the PC user subscriber with the correct formatting display.

The M1 information server provides real time interface to the authorization, usage and account object C3 while at the same time also providing isolation of the C3 object. The information server thus provides an intermediary which, among other things, prevents undesirable interaction between information retrieval and service implementation in the C3 authorization, usage and account object. Appropriate sizing of the capacity of the information server permits the provision of virtually instant access for subscribers without necessarily requiring interrelated sizing of the authentication, usage and account object.

The information server permits a subscriber to engage in real time monitoring of this activity and real time tracking of overall account status and balance. As such, the called subscriber may check on his account to determine whether to accept subsequent collect calls. Further, there is no requirement that the subscriber perform such monitoring or information gathering from a fixed locale. The information is as readily available from a hotel room by laptop computer as from the home location of the subscriber. The computer must be loaded with client software to perform the stated functions.

Some of the characteristics of this software is discussed below. In one embodiment, the client software need not validate that IP Access Network or IP Network connectivity has been established prior to attempting to communicate with the network. The availability of connectivity across these layers is assumed. The client software should use the same IP network drivers which are used for their existing ISP Internet connectivity. Client software driver conflicts or adverse interactions should not occur with the installed base of PC software. All management plane interfaces with the user may be via the PC's existing Web Browser. The client software need not take on the task of managing network based customer data.

The software must be able to transmit DTMF digits to the hop-off ITG. Preferably the digits will be transmitted "out of band" (in other words, the PC will not generate DTMF signals which are transmitted as compressed tones). The software should be able to transmit the length (duration) that a DTMF digit is pressed. The software should display to the user the current state of a call as it is made through the Internet Telephony Gateway (ITG).

The M2 Object (ITN Subscription Server Object) allows the PC user to subscribe to the VoIP service via an on-line process. Information gathered from the potential subscriber will include:

ISP (Internet Service Provider) account number
ISP email address
CPU type of PC, amount of memory
Type of sound card, microphone and speakers
Operating System and version
Global Service Provider (GSP)
Free disk space Upon activation the subscriber will receive notification via email. This email will include instructions, the web page URLs (Uniform Resource Locator or www (World Wide Web) address) needed to get started, and an initial password (which can be changed via M1).

Of particular import to the reverse billing capability is the M3 Object (ITN Billing System). Typically on Monthly basis, the M3 Object will poll C3 to extract account balances in order to request payments. As account balances are processed by the M3 Object, failed billing attempts will be flagged in a report (either formatted as ASCII, or in a PC database product's format).

As for the M4 Object (ITN Directory Maintenance), directory data (in the form of NPA-NXX ranges pointing to ITGs) will be created, validated, and managed outside of the network (away from C1, the ITN Directory Object). The M4 object is responsible for this finction. M4 will accomplish this by assisting in the creation of the Directory tables in a format which can be exported directly (via M4.I5) to C1. This Internet Telephony Directory Maintenance internal interface (M4.I5) is responsible for maintaining the NPA-NXX to hop-off ITG directory data. The M4 Object preferably also supports the creation of graphical maps showing the terminating call areas supported by the ITGs. The maps and the NPA-NXX table information may be exported so that it may be presented to the user via M1. Off the shelf software products like MapInfo may be used to support the requirements of M4.

Operationally the M4 Object is able to import NPA-NXX data, along with supporting graphical central office serving area information. The object is able to graphically define ITG terminating calling areas. The M4 Object automatically generates the NPA-NXX to ITG IP address Directory table based on the graphical information provided above. The M4 Object supports multiple versions of the C1 Object Directory database.

Further, the M5 Object (ITN Surveillance) attempts to identify and log critical alarms, and to present these alarms to an administrative console. Such alarms may include: whether a network based application is under distress (via an SNMP Management Information Block (MIB)), whether the system is alive and communicating with the network (via "Ping" or similar function), whether required application processes are active and if they need to be restarted (via a "ps-eaf" or similar function), and whether the processes are sane (via periodic test queries to validate correct responses).

These types of problems may be analyzed by M5, and alarms generated and logged within C5 at four levels: Critical (service affecting), Major (user intervention recommended), Minor (of note), and Informational (components reporting normal operation). These alarms may be used to manage a local database containing managed objects representing the current operational state of ITN platforms and processes. Each managed object and/or platform will be assigned one of three operational states: red (out of service), orange (operating with degraded capabilities), and green (operating normally). A graphical representation of the ITN network is presented to a console via a standard display package such as HP OpenView. Console operators have the option of directly connecting to any ITN object or system to perform troubleshooting or diagnostic operations. This connection presents the console operator with the same capabilities as a local system administrator.

With respect to M5 addressing requirements, new elements added to the ITN will have their IP addresses and their type of object identified in M5. The M5 Object will create its database of managed objects dynamically (once given the EP address or host name).

With regard to the user plane functions, the Vocoder 703 (in FIG. 7) includes capabilities such as echo cancellation, it should be able to handle varying levels of packet loss and latency, and it should be able to apply corrective algorithms to the voice stream. The voice played back to the PC subscriber, typically, will be toll quality.

In order to ensure ease of use and maximum utility to the subscriber it is desirable to provide for the subscriber an easy access and instructional tutorial as to the use of the system. At the same time it is also desirable to provide the called PC subscriber with his/her billing account balance, status, and call usage details on a real time basis; for example, access to such information may be via web pages on off a web server. Non-PC subscribers may access this information through, for example, an interactive voice response system (IVR) having a web enabled interface whereby a computer telephony application translates text and menu selections from the graphical web environment to voice prompts over a POTS line. In the case of the PC subscriber, the supplied information may include descriptions on how to download and install client software and operate the service, descriptions of service availability and pricing plans, graphical (map) areas showing the ITG terminating footprints, and NPA-NXX ranges supported by the ITG terminating footprints. With respect to account information the data available to the called PC subscriber may include call usage record details, billing account status and balance, and verification of the existing password. All of the foregoing may be conveniently provided through the use of an introductory page with links to pages that provide access to each of the foregoing.

Figure 9:
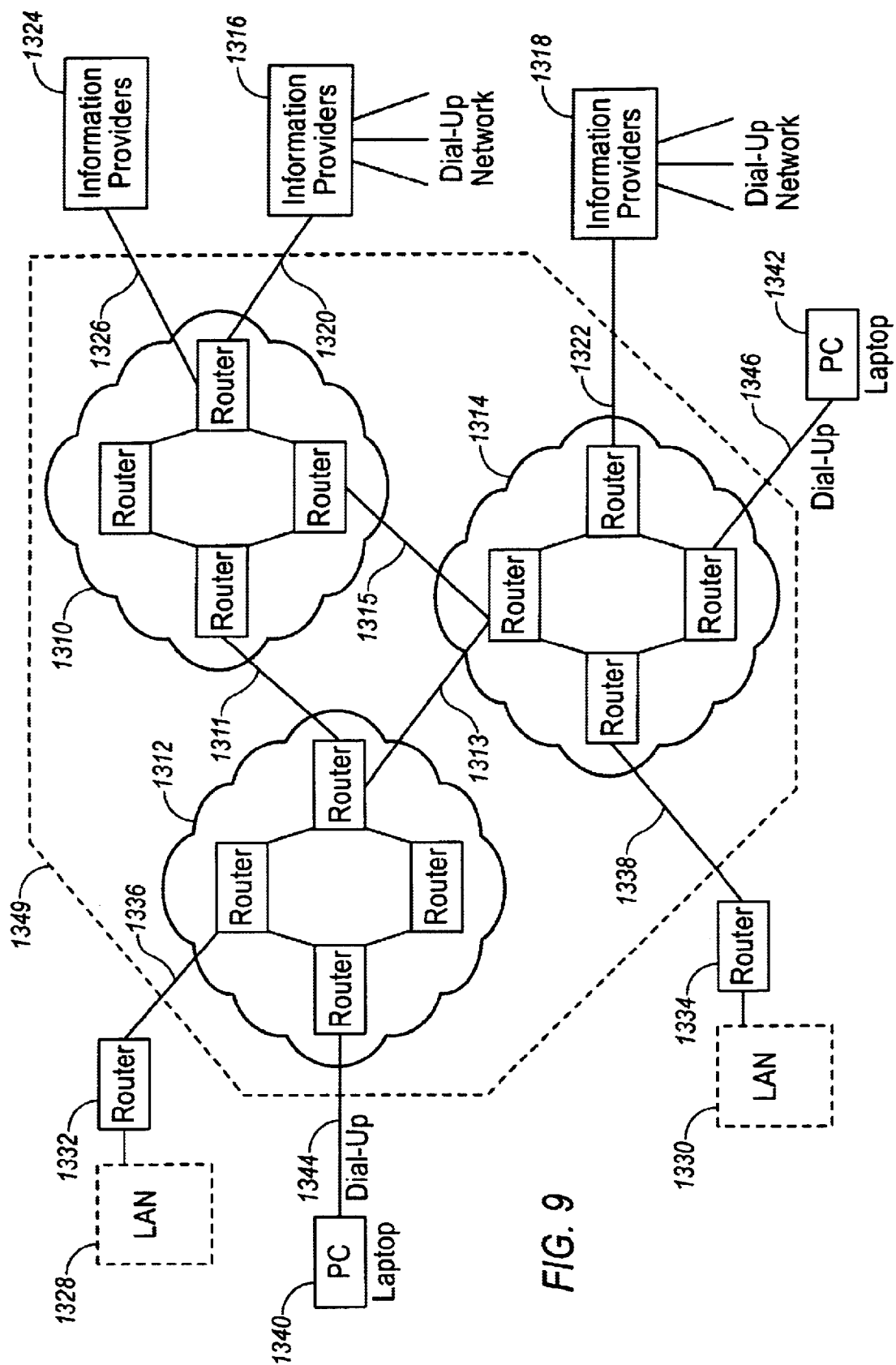
FIG. 9 shows a diagram of the router based architecture of the Internet.

FIG. 9 provides a simplified illustration of this aspect of the overall communication system with the necessary networking components to effect reverse billing of Internet calls. The IP Routed Internet/Intranet is shown at 1400. The Circuit Switched Network, such as a public switched telephone network, is shown at 1410. The circuit switched network serves a large number of subscriber terminals, here illustrated as telephone terminals 1412, 1414, and 1416. The telephone terminals may typically be connected to the circuit switched network via end offices or central offices 1418, 1420, and 1422 via local links or loops. It will be appreciated that these terminals may be distributed over a wide geographical area such as the entire United States or North America, by way of example.

The circuit switched network is connected to the packet switched network via a plurality of C2 call control objects or ITGs shown here by way of illustration as 1424, 1426, 1428, 1430, and 1432. These gateway control objects are connected to routers in the Internet/Intranet as shown at 1434, 1436, 1438, 1440, and 1442 respectively. The ITGs are also connected to end or central offices in the circuit switched network shown here as 1444, 1446, 1448, 1450, and 1452. Also connected to the Internet/Intranet are voice equipped personal computers or PCs 1454, 1456, and 1458. These PCs are shown connected to routers 1460, 1462, and 1464. It will be appreciated that the particular gateway or ITG chosen to effect a particular communication path is dependent upon multiple factors, such as the lowest cost connection through the telephone network or least distance (i.e., minimal hops). Thus the ITG 1424 may be chosen to effect a link between PC 1454 and telephone terminal 1412.

As has been explained, the gateway controllers are all linked to the C3 authentication, usage and account object 1466. The authentication, usage and account object in turn is linked to the information server object M1.

It is believed that this simplified diagrammatic illustration in FIG. 9 will facilitate an appreciation of the power of the authentication, usage, and account object C3 1466 acting in conjunction with the information server M1 1468. The arrangement permits the information server 1468 to provide to users almost immediate access to information regarding accounts which may actually be locally stored in instances of the authentication, usage and account object dispersed over an enormous geographical area. Such flexibility permits travelers to access their accounts from hotel rooms, while their employers may also access those accounts from the home or any branch office of the business establishment.

The arrangement of the ITN as discussed enables reverse billing capability over the PSTN and the Internet. Among other Internet Telephony services, the present invention provides for the use of a worldwide 800 number or the like. These 800 numbers are translated to a local Internet telephony gateway for the establishment of an Internet telephone call to a called subscriber. The call is tracked for billing and usage information by the control server. The control server may then transfer this information to the OSS for bill processing, in which the called subscriber is charged for the VoIP calls.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A telecommunication system for supporting billing of a called subscriber unit comprising:

a system of interlinked computer networks;

a plurality of separately located central office switching systems interconnected via trunk circuits for selectively establishing telephone call connections;

a computer terminal coupled to one of the computer networks for receiving and initiating telephone calls;

a voice station coupled to one of the central office switching systems for receiving and initiating telephone calls;

a control server coupled to the system of interlinked computer networks for providing authentication services, controlling routing of telephone calls through the system of interlinked computer networks, and processing billing and usage information related to the called subscriber unit, wherein the computer terminal, the voice station, or both can be designated as the called subscriber unit, the control server managing the telephone calls over the systems of interlinked computer networks and tracking the billing and usage information of the called subscriber unit; and one or more gateways selectable by the control server for interfacing the system of interlinked computer networks to the plurality of separately located central office switching systems.

2. The system as in claim 1, further comprising an "800" service database comprising "800" service information associated with the called subscriber unit, wherein the control server authenticates based on the "800" service information.

3. The system as in claim 1, further comprising a common channel signaling (CCS) system for linking the plurality of separately located central office switching systems, wherein the control server communicates using the CCS system to determine whether the called subscriber unit is busy.

4. The system as in claim 1, wherein the control server selects one of the gateways based upon cost criteria.

5. The system as in claim 1, wherein the control server selects one of the gateways based upon time of day and point of origin of the telephone calls.

6. The system as in claim 1, further comprising a web server coupled to the system of interlinked computer networks for providing a graphical interface to initiate and receive the telephone calls.

7. The system as in claim 6, wherein the web server prompts a calling party for a login identification and a password to determine whether the calling party is a valid calling party.

8. The system as in claim 7, wherein the prompts are initiated after the gateway begins authenticating the called number.

9. The system as in claim 6, where in the web server prompts a calling party for a called subscriber identification.

10. The system as in claim 9, wherein the called subscriber identification comprises an actual directory number of the voice station.

11. The system as in claim 9, wherein the called subscriber identification comprises an alphanumeric string of characters.

12. The system as in claim 1, further comprising a profile database accessible by the control server, the profile database comprises records of calling parties predesignated by a called subscriber, and the profile database is used to restrict a calling party from completing one or more of the telephone calls.

13. The system as in claim 1, further comprising a services control point, separate from the central office switching systems, for controlling switching of calls via one or more of the central office switching systems.

14. The system as in claim 1, further comprising a signaling transfer point, separate from the central office switching systems, for routing call related signaling messages between central office switching systems.

15. The system as in claim 1, wherein in band signaling is used by the central office switching systems to determine whether the called subscriber unit is busy.

16. The system as in claim 1, wherein the voice station initiates the telephone call by dialing into the gateway, the voice station using an access code to indicate to the gateway that the telephone call is to be routed via the system of interlinked computer networks.

17. The system as in claim 1, wherein when the voice station initiates a telephone call to the computer terminal, if the gateway determines that the computer terminal is unable to receive the telephone call, the telephone call is rerouted to a voice station that is different from the initiating voice station.

18. The system as in claim 1, wherein when the voice station initiates a telephone call to the computer terminal, if the gateway determines that the computer terminal is unable to receive the telephone call, the gateway prompts the initiating voice station for a message.

19. A telecommunication system for providing reverse billing capability, comprising:

a system of interlinked computer networks;

a plurality of separately located central office switching systems interconnected via trunk circuits for selectively establishing telephone call connections;

a plurality of voice stations coupled to one of the central office switching systems for receiving and initiating telephone calls;

a control server coupled to the system of interlinked computer networks for providing authentication services, controlling routing of telephone calls through the system of interlinked computer networks, and providing billing and usage information related to a called subscriber unit, wherein the called subscriber unit is at least one of the plurality of voice stations, the control server managing the telephone calls over the system of interlinked computer networks and tracking the billing and usage information of the called subscriber unit;

an originating gateway coupled to the control server for interfacing the system of interlinked computer networks to the plurality of separately located central office switching system; and a terminating gateway coupled to the control server for interfacing the system of interlinked computer networks to the plurality of separately located central office switching systems.

20. The system as in claim 19 further comprising an "800" database comprising "800" service information associated with the called subscriber unit, wherein the control server authenticates based on the "800" service information.

21. A telecommunication system for providing reverse billing capability, comprising:

a plurality of computer networks communicating via a Transmission Control Protocol/Internet Protocol (TCP/IP);

a computer terminal coupled to one of the computer networks;

a web server communicating with the computer terminal configured for establishing a telephone call;

a public switched telephone network (PSTN) providing Plain Old Telephone Service (POTS); a voice station receiving POTS service, the voice station having a directory number;

a called subscriber unit comprising the computer terminal or the voice station;

a gateway for interfacing the plurality of computer networks with the public switched telephone network; and a control server coupled to one of the plurality of computer networks comprising:

a routing table used for routing the telephone call;

a billing and usage database comprising records related to the called subscriber unit;

an authentication database comprising records associated with the called subscriber computer terminal and a predesignated profile of calling party stations, wherein the control server manages the telephone calls over the plurality of computer networks and tracks the billing and usage information of the called subscriber unit, the called subscriber unit being registered with the control server.

22. The system as in claim 21, wherein the PSTN is coupled to an "800" service database comprising "800" service information associated with the subscriber unit, wherein the control server authenticates based on the "800" service information.

23. A telecommunication system for providing reverse billing capability, comprising:

a plurality of computer networks communicating via a Transmission Control Protocol/Internet Protocol (TCP/IP);

a public switched telephone network (PSTN) providing Plain Old Telephone Service (POTS);

at least two voice stations receiving POTS service, each of the voice stations having a directory number, at least one of the voice stations is a called subscriber unit;

a gateway for interfacing the plurality of computer networks with the public switched telephone network; and a control server coupled to one of the plurality of computer networks comprising:

a routing table used for routing the telephone call;

a billing and usage database comprising records related to the called subscriber unit;

an authentication database comprising records associated with the called subscriber computer terminal and a predesignated profile of calling party stations, wherein the control server manages the telephone calls between the two voice stations over the plurality of computer networks and tracks the billing and usage information of the called subscriber unit.

24. The system as in claim 23, wherein the PSTN is coupled to an "800" service database comprising "800" service information associated with the subscriber unit, wherein the control server authenticates based on the "800" service information.

25. A method for providing reverse billing capability, comprising:

supplying a called subscriber information for establishing a telephone call communication between a computer terminal and a voice station to a web server;

determining whether the called subscriber information is valid;

providing routing information in response to the determining step, the routing information comprising identification of a particular gateway among a plurality of gateways on the data network;

initiating a communication session with the particular gateway;

authenticating the communication session with the particular gateway;

terminating the communication session based upon the authenticating step;

establishing the telephone call between the computer terminal and the voice station if the communication session with the particular gateway has not been terminated; and tracking billing and usage information associated with the telephone call via a control server, the control server processing the billing and usage information to charge a called party for the telephone call.

26. The method as in claim 25, wherein the determining, routing, and authenticating steps are performed by a control server.

27. The method as in claim 25, wherein the providing of routing information step comprises selecting a gateway based upon cost criteria.

28. The method as in claim 25, wherein the providing of routing information step comprises selecting a gateway based upon time of day and point of origin of the telephone call.

29. The method as in claim 25, wherein the authenticating step further comprises prompting the calling party for a login identification and a password via the web server.

30. The method as in claim 25, wherein the called subscriber identification comprises an actual directory number of the voice station.

31. The method as in claim 25, wherein the called subscriber identification comprises an alphanumeric string of characters.

32. The method as in claim 25, wherein the particular gateway is located within a LATA boundary that is the same as the control server.

33. The method as in claim 25, wherein the called subscriber information is associated with the voice station.

34. The method as in claim 25, wherein the called subscriber information is associated with the computer terminal.

35. A method for providing reverse billing capability to charge a called party account, comprising:

supplying called subscriber information to an originating gateway on a data network for a telephone call between a first voice station and a second voice station, the called subscriber information being associated with the called party account and the first voice station or the second voice station;

determining whether the called subscriber information is valid;

providing routing information in response to the determining step, the routing information comprising identification of the terminating gateway on the data network;

establishing a communication session between the originating gateway and the terminating gateway;

authenticating the communication session via a control server, the control server signaling the terminating gateway to confirm authentication;

establishing the telephone call between the computer terminal and the voice station via the originating and terminating gateways;

tracking billing and usage information associated with the established telephone call; and charging the called party account for the telephone call based upon the billing and usage information.

36. A method as in claim 35, wherein the providing of routing information step comprises selecting the terminating gateway based upon cost criteria.

37. A method as in claim 35, wherein the providing of routing information step comprises selecting the terminating gateway based upon time of day and point of origin of the telephone call.

* * * * *